(12) United States Patent
Dobie et al.

(10) Patent No.: US 8,042,533 B2
(45) Date of Patent: Oct. 25, 2011

(54) HIGH SPEED CONVECTION OVEN

(75) Inventors: Michael J. Dobie, Double Oak, TX (US); Carlos Bacigalupe, The Colony, TX (US); Russell Rose, Shady Shores, TX (US)

(73) Assignee: Turbochef Technologies, Inc., Atlanta, GA (US)

( * ) Notice: Subject to any disclaimer, the term of this patent is extended or adjusted under 35 U.S.C. 154(b) by 211 days.

(21) Appl. No.: 11/791,429

(22) PCT Filed: Dec. 2, 2005

(86) PCT No.: PCT/US2005/043847
§ 371 (c)(1),
(2), (4) Date: May 23, 2007

(87) PCT Pub. No.: WO2006/060751
PCT Pub. Date: Jun. 8, 2006

(65) Prior Publication Data
US 2007/0295322 A1  Dec. 27, 2007

Related U.S. Application Data

(60) Provisional application No. 60/666,515, filed on Mar. 29, 2005, provisional application No. 60/633,093, filed on Dec. 3, 2004.

(51) Int. Cl.
*F24C 15/32* (2006.01)

(52) U.S. Cl. .................. 126/21 A; 126/19 R; 126/21 R; 126/273 R; 126/339; 99/330; 99/443 R; 219/400; 237/52

(58) Field of Classification Search ............... 126/21 A, 126/170, 176 R, 19 R, 21 R, 41 C, 174, 176 A, 126/273 R, 332, 337 R, 339; 99/330, 371, 99/443 R, 446; 219/391, 400; 237/52; 454/237, 454/239, 305; *F24C 15/32*
See application file for complete search history.

(56) References Cited

U.S. PATENT DOCUMENTS 383,147 A * 5/1888 Rau .............................. 126/21 R
(Continued)

FOREIGN PATENT DOCUMENTS
EP      419213 A2 * 3/1991
(Continued)

*Primary Examiner* — Steven B McAllister
*Assistant Examiner* — Daniel E Namay
(74) *Attorney, Agent, or Firm* — Dean W. Russell; Kristin M. Crall; Kilpatrick Townsend & Stockton LLP

(57) ABSTRACT

A convection heating apparatus capable of providing effective, high speed cooking without the assistance of microwave energy. The oven apparatus includes an exterior cabinet, a door, and a cooking chamber having interior side walls, a back wall, and a lower jet plate. The oven further includes a blower for circulating gas through the lower jet plate into the cooking chamber. In addition, the oven includes a product support disposed within the cooking chamber above said lower jet plate. The product support is disposed on a rail that is positioned to hold the lower jet plate in place when air is circulated therethrough. Optionally, the oven further includes an upper jet plate disposed within the cooking chamber above the product support. Temperature controlled gas is circulated through the upper jet plate toward the product support and any food product disposed on the product support. The oven may also include means for imparting movement to the product support during cooking operations in order to provide a more even cooking of a food product. A catalytic converter material is disposed downstream from the blower and upstream from a return plate which controls the direction of gas flow from the cooking cavity and protects the catalytic converter material.

16 Claims, 22 Drawing Sheets

U.S. PATENT DOCUMENTS

| | | | | |
|---|---|---|---|---|
| 1,776,929 A * | 9/1930 | Reedy | | 126/273 R |
| 2,111,438 A * | 3/1938 | Smith | | 110/278 |
| 2,339,365 A * | 1/1944 | Guilder | | 432/76 |
| 2,339,422 A * | 1/1944 | Phares | | 126/41 E |
| 2,897,746 A * | 8/1959 | Hilgers | | 99/443 R |
| 3,239,949 A * | 3/1966 | Miles | | 34/233 |
| 3,545,832 A * | 12/1970 | Levenback | | 312/114 |
| 3,556,077 A * | 1/1971 | Tilus | | 126/19 R |
| 3,820,525 A * | 6/1974 | Pond | | 126/21 A |
| 3,920,271 A * | 11/1975 | Bluestone | | 285/148.22 |
| 4,147,382 A * | 4/1979 | Wachter | | 285/189 |
| 4,471,750 A * | 9/1984 | Burtea | | 126/21 A |
| 4,829,158 A * | 5/1989 | Burnham | | 219/400 |
| 4,881,519 A | 11/1989 | Henke et al. | | |
| 5,107,097 A * | 4/1992 | Negandhi et al. | | 219/400 |
| 5,205,274 A * | 4/1993 | Smith et al. | | 126/21 A |
| 5,265,587 A * | 11/1993 | Carlson | | 126/174 |
| D342,130 S * | 12/1993 | Anderson et al. | | D23/393 |
| 5,277,105 A * | 1/1994 | Bruno et al. | | 99/443 C |
| 5,401,940 A | 3/1995 | Smith et al. | | |
| 5,717,192 A * | 2/1998 | Dobie et al. | | 219/681 |
| 6,131,559 A * | 10/2000 | Norris et al. | | 126/21 A |
| 6,218,650 B1 | 4/2001 | Tsukamoto et al. | | |
| 6,231,704 B1 * | 5/2001 | Carpinetti | | 156/71 |
| 6,252,201 B1 * | 6/2001 | Nevarez | | 219/388 |
| 6,350,965 B2 * | 2/2002 | Fukushima et al. | | 219/401 |
| 6,399,930 B2 * | 6/2002 | Day et al. | | 219/681 |
| 6,425,388 B1 * | 7/2002 | Korinchock | | 126/21 R |
| 6,557,543 B2 * | 5/2003 | Cole et al. | | 126/21 A |
| 6,712,063 B1 * | 3/2004 | Thorneywork | | 126/21 A |
| 6,874,495 B2 * | 4/2005 | McFadden | | 126/21 A |
| 7,422,009 B2 * | 9/2008 | Rummel et al. | | 126/21 A |
| 7,468,495 B2 * | 12/2008 | Carbone et al. | | 219/400 |

FOREIGN PATENT DOCUMENTS

| | | | |
|---|---|---|---|
| EP | 0 482 255 | | 4/1992 |
| EP | 0 592 255 | | 4/1994 |
| GB | 1 379 370 | | 1/1975 |
| GB | 2189592 A | * | 10/1987 |
| JP | 61122427 A | * | 6/1986 |
| JP | 03151920 A | * | 6/1991 |
| WO | WO 89/08402 | | 9/1989 |
| WO | WO 96/39790 | | 12/1996 |
| WO | WO 96/41499 | | 12/1996 |
| WO | WO 2004/014139 | | 2/2004 |

* cited by examiner

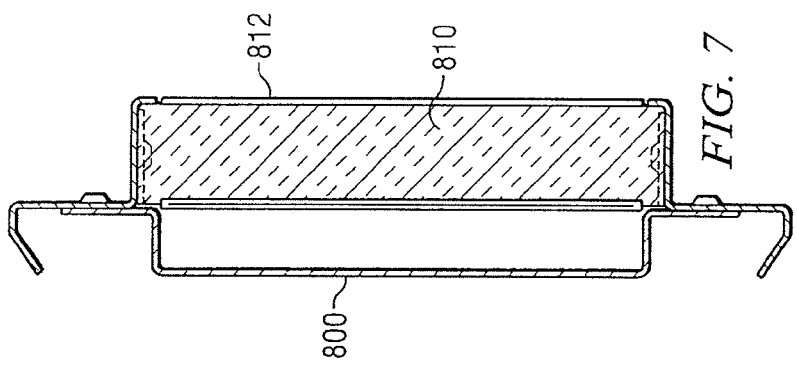
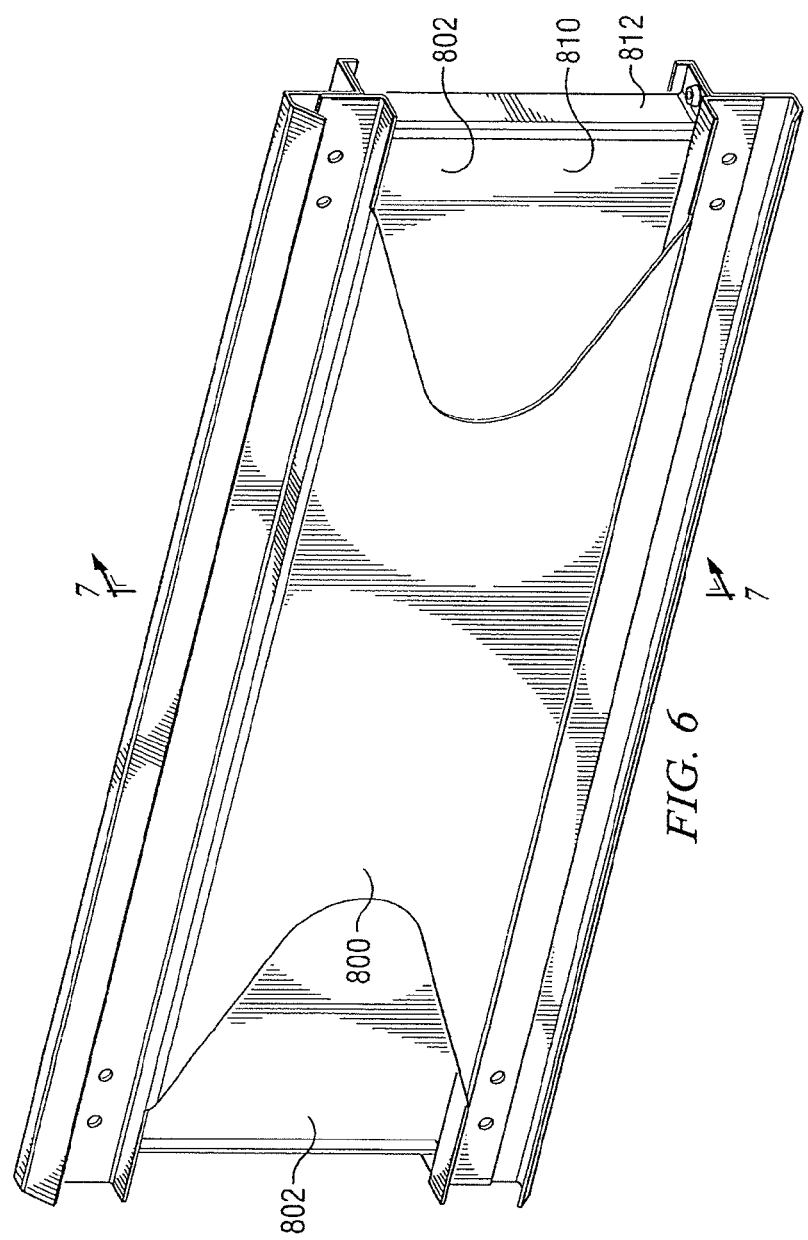

US 8,042,533 B2

HIGH SPEED CONVECTION OVEN

This application is the U.S. national phase application of International Application No. PCT/US2005/043847 filed on Dec. 2, 2005 and published in English on Jun. 8, 2006 as International Publication No. WO 2006/060751 A2 which application claims the benefit of U.S. Provisional Application No. 60/666,515 filed on Mar. 29, 2005 and U.S. Provisional Application No. 60/633,093 filed on Dec. 3, 2005, the contents of which are incorporated herein by reference.

FIELD OF THE INVENTION

The present invention relates to a high speed convection oven, and more particularly, to high heat transfer rate convection oven utilizing heated jets of air to cook food products.

BACKGROUND OF THE INVENTION

The oven disclosed herein relates primarily to ovens suitable for use in the commercial food service industry, such as fast food restaurants, and other food service application where there is great variety in the food products prepared, the need for speedy thermalization of food and space constraints. While various oven designs are known and available for commercial food service applications, there still exists a need for an efficient, cost-effective oven that provides high speed cooking of a wide range of food products. Convection cooking ovens, including ovens that utilize microwave, are available and well known. While such ovens meet the needs of certain commercial food service applications by providing rapid thermalization and cooking, the use of microwave complicates oven design and adds costs to the oven.

The present invention provides an oven that meets a need in the food service industry for an oven that is both cost-effective and provides rapid heating/cooking without the need for microwave energy to boost cooking speed.

SUMMARY OF THE INVENTION

The present invention relates to a convection oven that provides high speed cooking without the need for microwave enhancement. In a preferred embodiment, the oven includes an exterior cabinet, a door, and a cooking chamber having interior side walls, a back wall, and a lower jet plate. The oven further includes a blower for circulating gas through the lower jet plate into the cooking chamber. In addition, the oven includes a product support disposed within the cooking chamber above said lower jet plate. The product support is disposed on a rail that is positioned to hold the lower jet plate in place when air is circulated therethrough. Preferably, the product support is a rack.

In another preferred embodiment, the above described oven further includes an upper jet plate disposed within the cooking chamber above the product support. Temperature controlled gas is circulated through the upper jet plate toward the product support and any food product disposed on the product support.

In yet another embodiment of the invention, the oven includes a means for imparting movement to the product support during cooking operations in order to provide a more even cooking of a food product. Preferably, the means for imparting movement to the product support imparts lateral movement to the support; most preferably in a front-to-back direction.

In yet another preferred embodiment of the invention, the means for imparting movement to the product support includes at least one pin disposed within the cooking chamber and the product support includes a pair of downwardly extending prongs between which the pin is seated. Most preferably, the prongs have lower ends that flare outwardly to guide the seating of the pins between the prongs.

In yet another aspect, the oven comprises a lower duct having (a) a proximal end adjacent the blower, (b) a distal end (c) an inlet opening adjacent the proximal end through which said gas is circulated into the lower duct, (d) a top side defined by the lower jet plate and (e) a bottom wall that is curved such that the lower duct has a cross sectional area adjacent the inlet opening that is greater than the cross sectional area of the lower duct at its distal end. Most preferably, the curved bottom wall provides a cross sectional area reduction of about 50% of the inlet opening area at about one-third of distance from the inlet opening.

In a further aspect of the invention, the oven also includes an upper jet plate having a plurality of orifices and an upper duct having (a) a proximal end adjacent the blower, (b) a distal end, (c) an inlet opening adjacent its proximal end through which gas is circulated into the upper duct, (d) a bottom side defined by the upper jet plate and (e) a top wall that is curved such that the upper duct has a cross sectional area adjacent the inlet opening that is greater than the cross sectional area of the upper duct at its distal end.

In yet another aspect of the invention, the oven includes a removable drain conduit disposed beneath an opening in the lower jet plate, whereby liquids accumulating atop the lower jet plate can travel through the drain conduit toward an drain opening disposed at and through the bottom of the oven. In a more preferred embodiment, the drain opening disposed at bottom of the oven is configured to permit liquid disposed in the oven below the lower jet plate to flow through the drain opening.

In another aspect of the invention, the oven has a gas return opening in the cooking chamber through which gas exits the cooking cavity and returns to the blower. Disposed adjacent the return opening is return plate shaped to control the direction of air flow from the cooking cavity. Preferably, the plate is substantially hour glass in shape. Alternatively, the return plate has a center portion with few or no perforations and lateral ends with a greater number of perforations. In another aspect of the invention, the oven includes a catalytic converter material upstream of said blower; preferably downstream of the return plate.

BRIEF DESCRIPTION OF THE DRAWINGS

FIG. 6 is a perspective view of the air return plate and catalytic converter assembly of the present invention;

FIG. 7 is a cross-sectional view of the air return plate and catalytic converter assembly of the present invention;

FIG. 12 is a perspective view of the oven with the alternative return air plate 800a;

FIG. 13 is a cross-sectional view of the oven with the alternative return air plate 800a;

FIG. 14 is a perspective view of the alternative return air plate 800a;

FIG. 15 is a cross sectional view of the alternative return air plate 800a;

FIG. 16 is a top view of the alternative return air plate 800a;

DETAILED DESCRIPTION OF THE INVENTION

Figure 1:
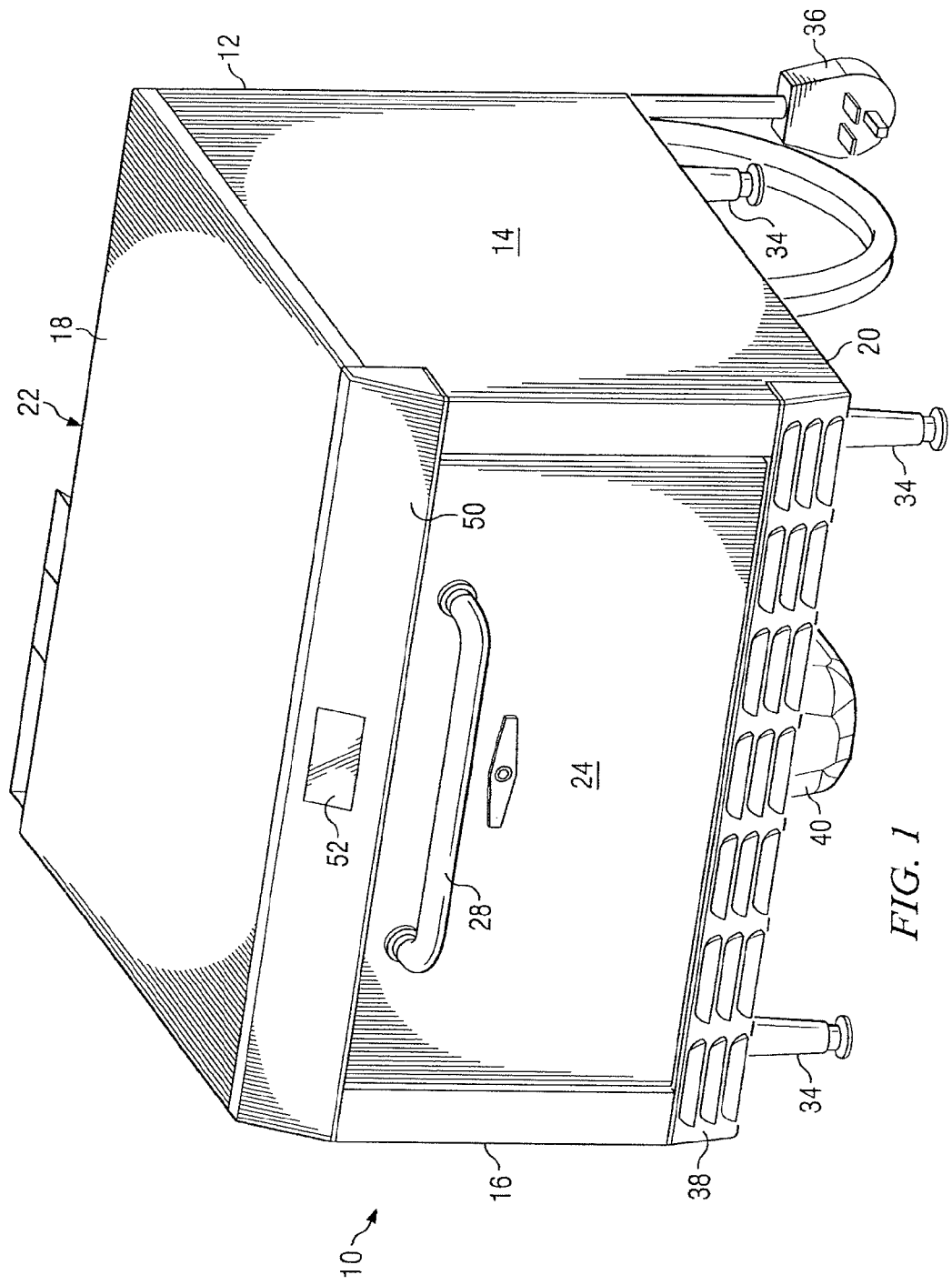
FIG. 1 is a perspective view of the exterior of an oven embodying the present invention.

The descriptions of the preferred embodiments of the invention provided below are made with reference to the drawings attached hereto. The drawings have been consecutively numbered as FIGS. 1-2D. Use of common reference numerals in the various alternative embodiments of the invention indicate common structures between those embodiments.

In FIGS. 1-4, there is shown a preferred embodiment of the oven 10 of the present invention. Oven 10 includes an exterior cabinet 12 defined by exterior side walls 14 and 16, exterior top 18 and bottom 20 walls, an exterior rear wall 22 and door 24. Preferably said walls are constructed of a stainless steel material. Door 24 is attached to oven 10 at hinges 25, allowing access to the cooking chamber 30. Hinges 25 are spring-loaded, allowing the door to be maintained in an opened or closed position. A handle 28 is secured to door 24 to allow the door to be opened or closed.

Figure 2:
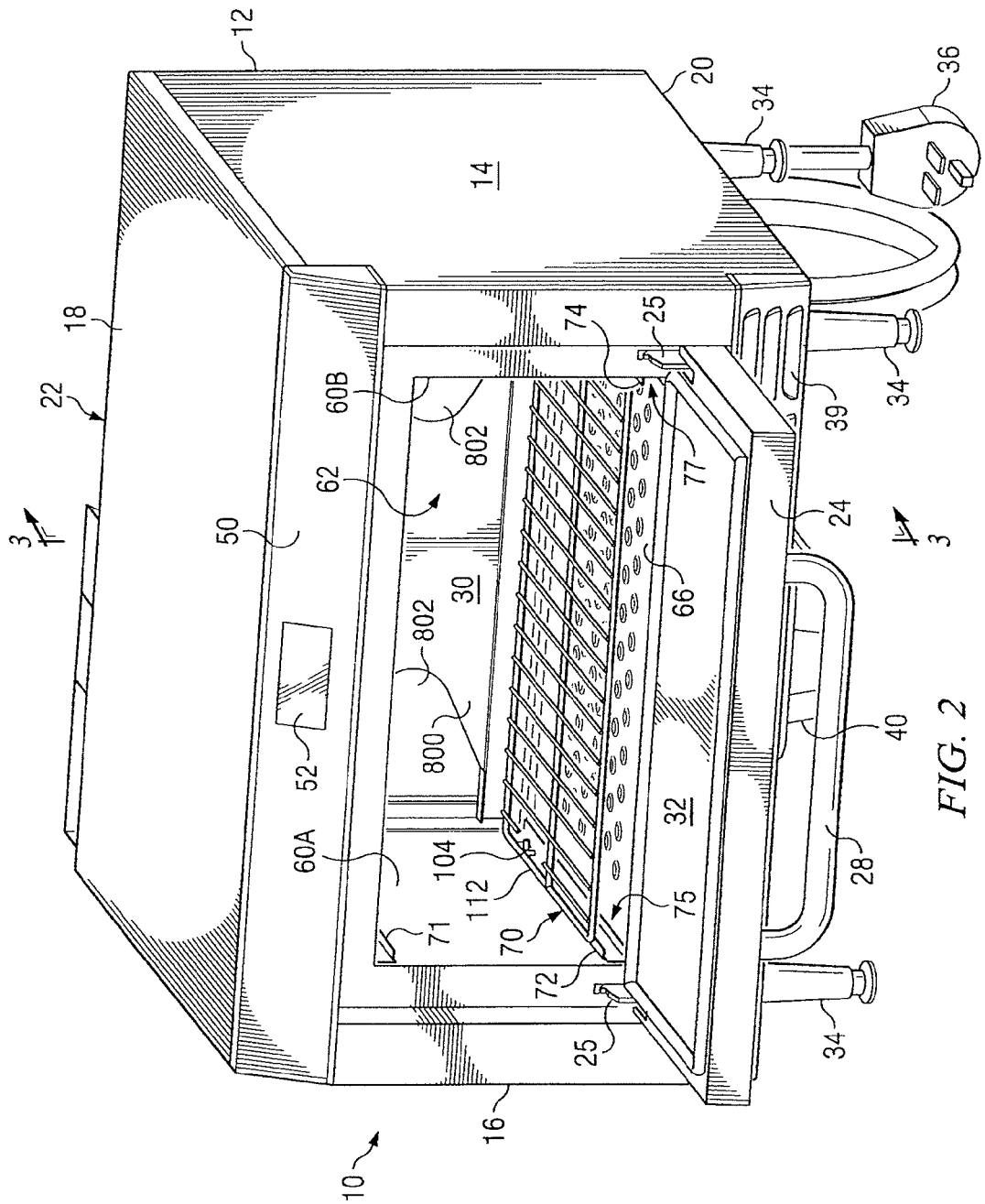
FIG. 2 is a perspective view of an oven embodying the present invention.
Figure 3:
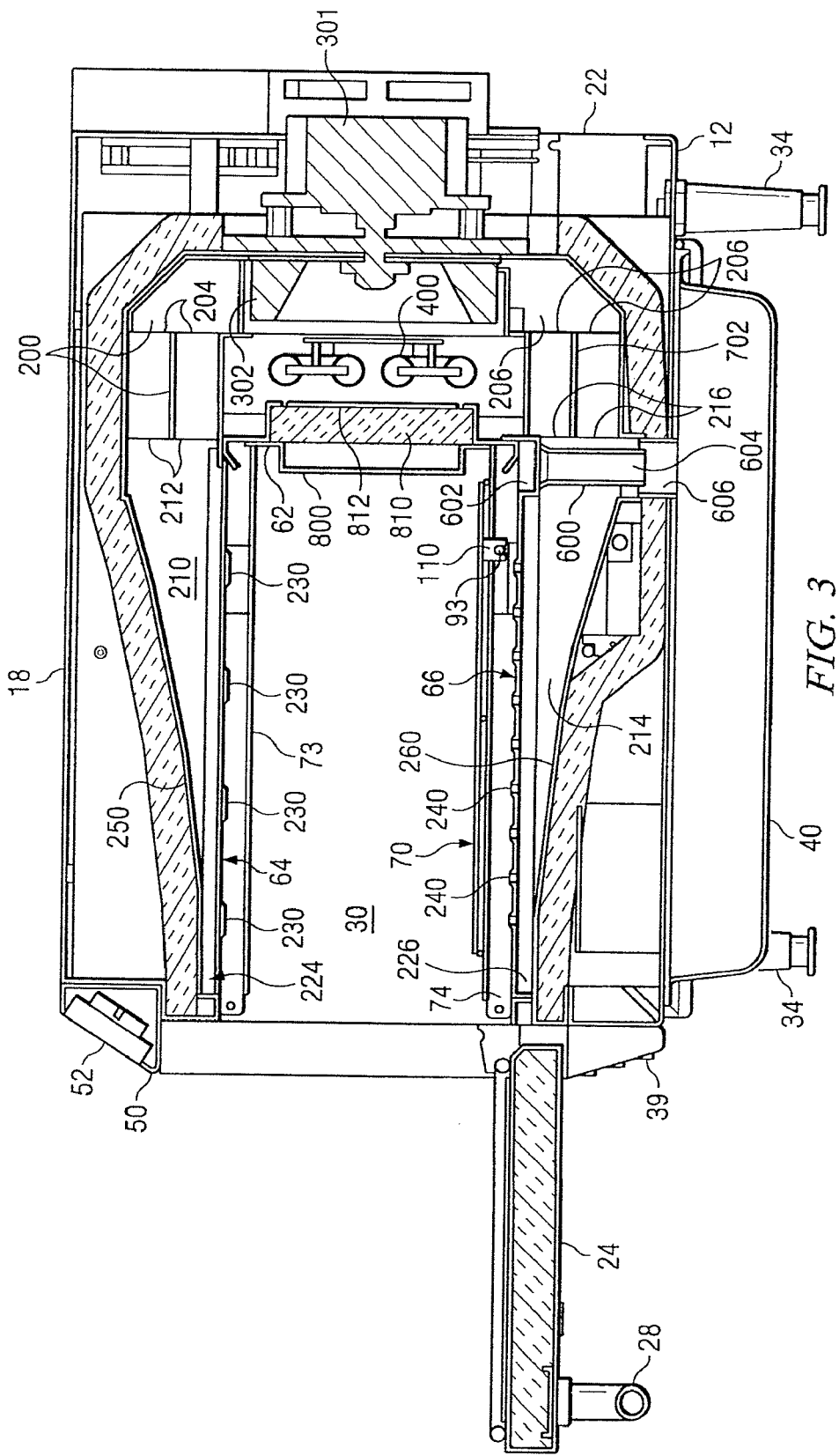
FIG. 3 is a cross-sectional view of an oven embodying the present invention.

Referring to FIGS. 2 and 3, the interior chamber 30 of the oven is defined by interior side walls 60A and 60B, back wall 62 (collectively the interior oven walls), an upper (or top) jet plate 64, a lower (or bottom) jet plate 66 and the interior surface 32 of door 24. Preferably, the interior oven walls, the jet plates and the interior surface of the door are constructed of a stainless steel material.

Disposed within interior chamber between jet plates 64 and 66 is a product support 70. In the preferred embodiment, best shown in FIG. 3, the product support 70 is a rack. Rack 70 rests on rails 72 and 74 disposed on opposite sides of the oven chamber adjacent side walls 60A and 60B, respectively. In addition to supporting the rack, rails 72 and 74 also help to hold lower jet plate 66 in place when air is circulated therethrough which would otherwise tend to lift the lower jet plate. Rails 72 and 74 also provide a sealing surface between the jet plate and rail surface, which serves to prevent or reduce the amount of air escaping between the rail and jet plate, which in turn increases the amount of airflow through the jet plate orifices. Similarly, rails 71 and 73 are provided below the upper jet plate 64 and function to support the upper jet plate, as well as provide a seal between the rails and the jet plate.

Figure 5:
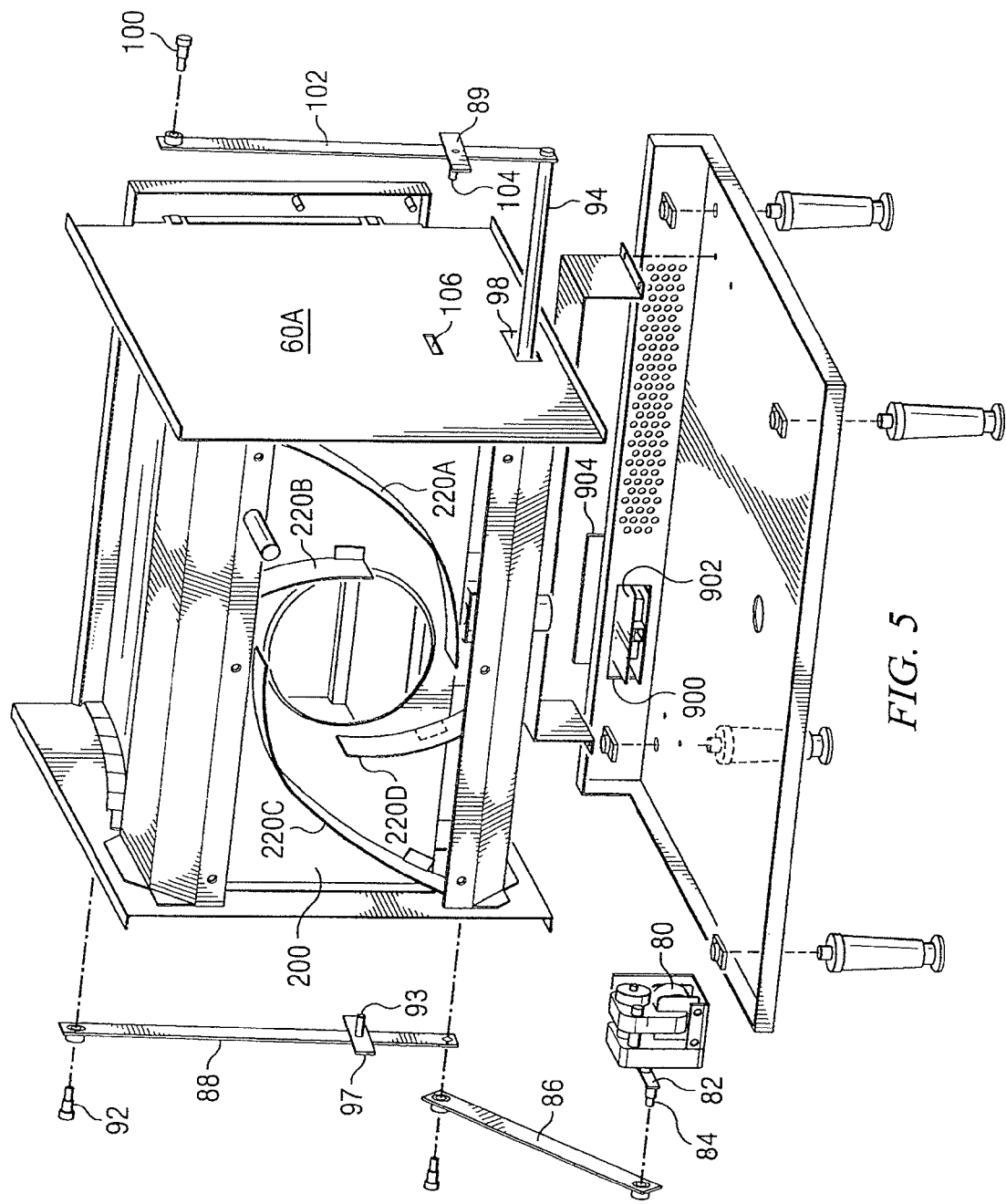
FIG. 5 is a partial exploded view depicting the rack movement mechanism and plenum vane configuration of the present invention.
Figure 5A:
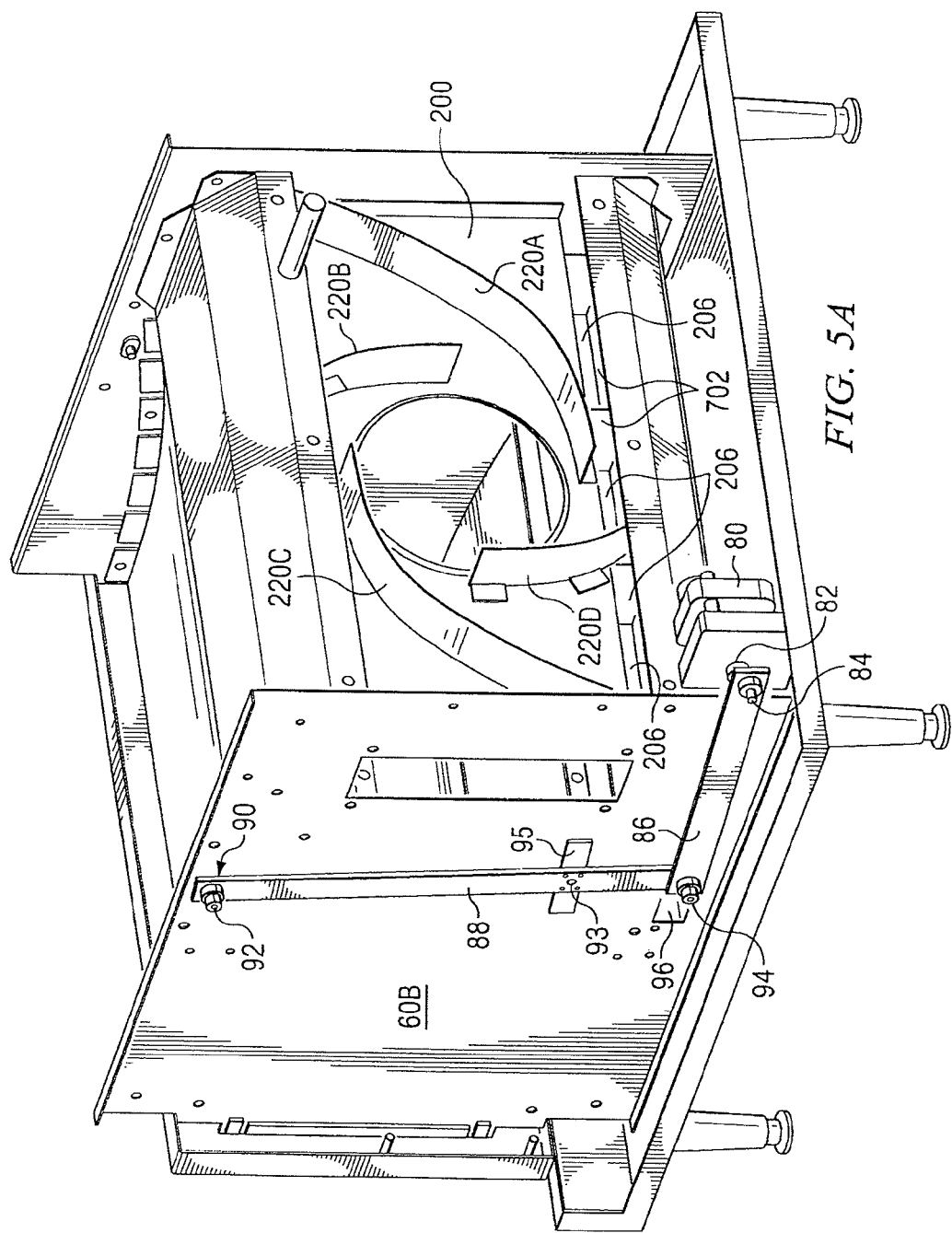
FIG. 5A is a perspective view of the oven without the exterior housing depicting the rack movement mechanism and plenum vane configuration of the present invention.

In one preferred embodiment of the oven, rack 70 is part of a rack mechanism that imparts movement to the rack during cooking operations in order to provide more even cooking of food products. FIGS. 5 and 5A depict a preferred rack movement mechanism. As shown, the rack mechanism includes gear motor 80 with a crank 82 and shaft 84 operably connected thereto. Connected to the crank 82 is a substantially horizontal arm 86 which is connected to a substantially vertical swing arm 88. Swing arm 88 pivots at point 90 via pivot pin 92. Rack pin 93 is attached to swing arm 88 and extends into the cooking chamber 30 through opening 95 in the oven side wall 60B. Disposed between rack pin 93 and swing arm 88 is plate 97 having a sealing surface adjacent side wall opening 95. Plate 97 and its sealing surface are large enough to cover and substantially seal opening 95 through the entire range of swinging motion of the swing arm. In a preferred embodiment the sealing surface is made of a Teflon® material.

A shaft 94 is attached to swing arm 88 and is positioned to extend through opening 96 in side wall 60B and across the oven through opening 98 in the opposite side wall 60A. A second swing arm 102 is attached to the opposite end of shaft 94. Second swing arm 102 is pivotably mounted to the oven at pivot pin 100. A rack pin 104 is attached to second swing arm 102 between shaft 94 and pivot pin 100. Rack pin 104 extends from second swing arm 102 into the oven cooking chamber through opening 106 on side wall 60A. Disposed between rack pin 104 and swing arm 102 is plate 99 having a sealing surface adjacent side wall opening 106. Plate 99 and its sealing surface are large enough to cover and substantially seal opening 106 through the entire range of swinging motion of the swing arm. In a preferred embodiment the sealing surface is made of a Teflon® material.

As shown in FIGS. 2 and 3, rack 70 is positioned over rack pins 93 and 104 such that rack pin 93 is disposed between prongs 110 which extend downwardly from rack 70 adjacent side wall 60B and rack pin 104 is disposed between prongs 112 which extend downwardly from rack 70 adjacent side wall 60A. In a preferred embodiment, as shown in FIG. 3, the lower ends of prongs 110 and 112 flare outwardly to help guide the seating of rack 70 on rack pins 93 and 104.

In operation, the above-described rack mechanism imparts a back-and-forth movement to the rack during cooking operations allowing heated air to sweep over the surface of a food product (or pan), enhancing the uniformity of cooking. The mechanism described above provides movement in a substantially front-to-back direction; however other means for providing movement of the rack or product support relative to the jet plates are suitable, such as means which provide side to side movement or rotational movement of the rack or product support.

Figure 17:
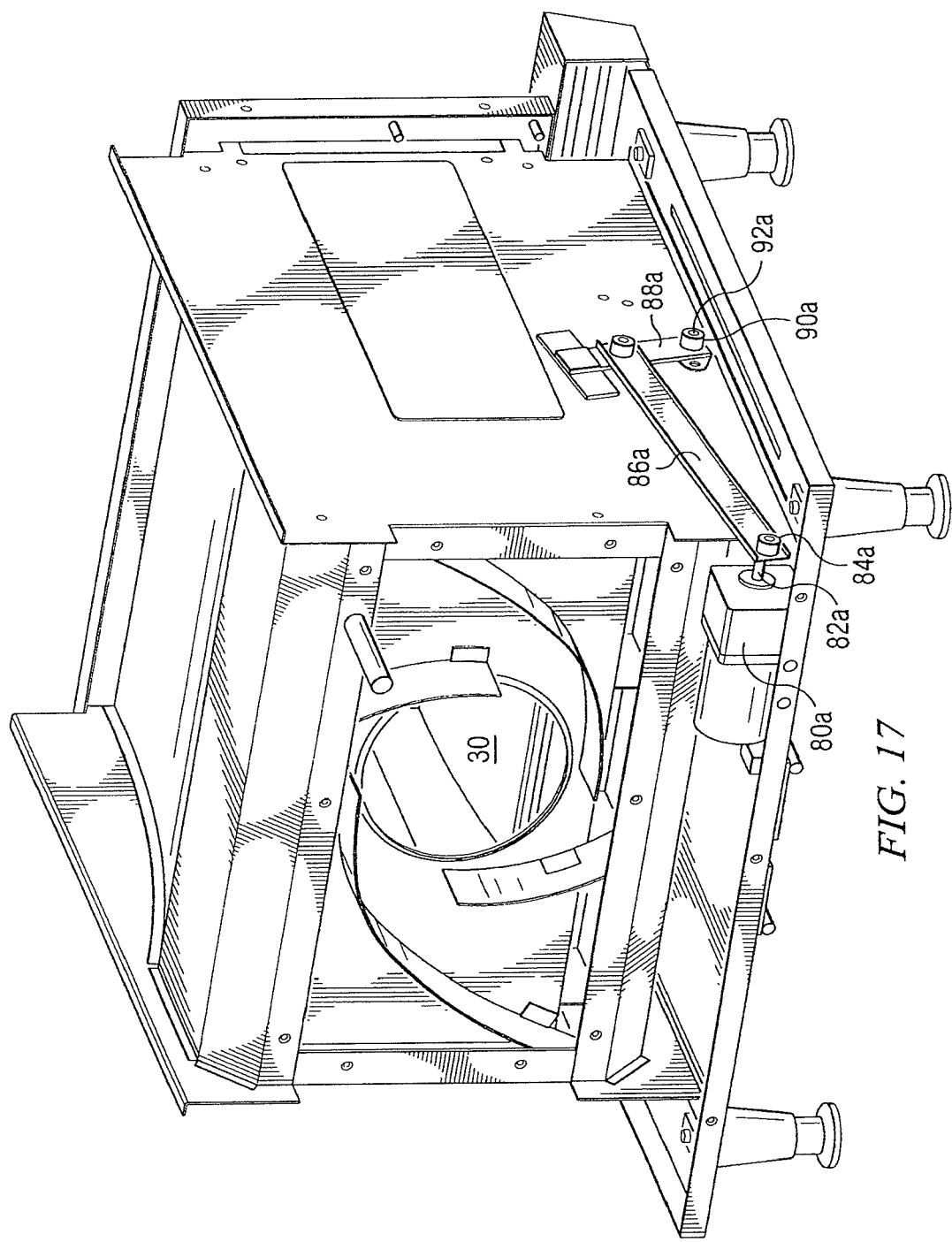
FIG. 17 is a perspective view of the oven without the exterior housing depicting the alternative rack movement mechanism.
Figure 18:
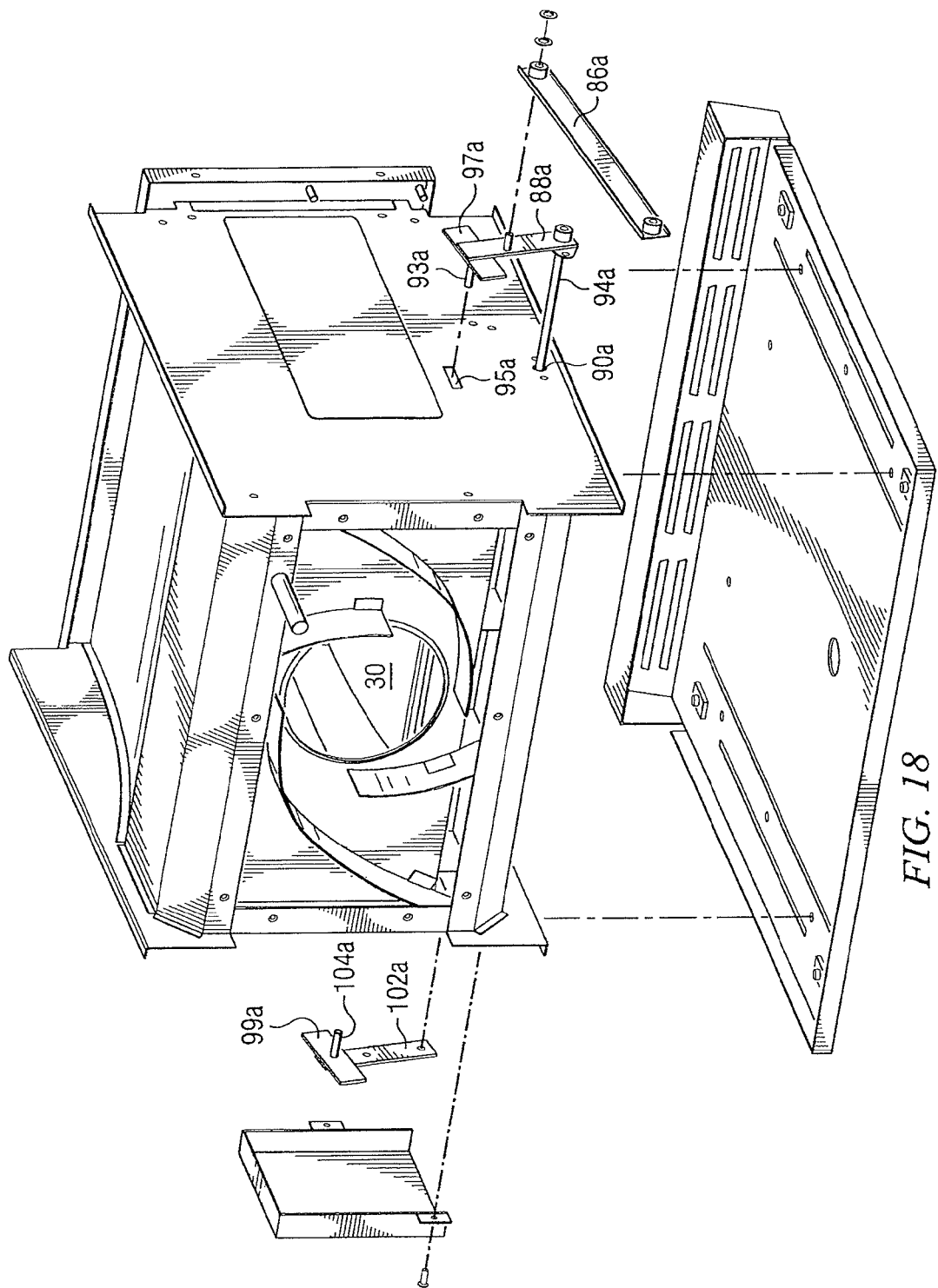
FIG. 18 is a partial exploded view depicting the alternative rack movement mechanism.

An alternative, preferred rack movement mechanism, also designed to impart a back-and-forth movement to the rack during cooking operations, is depicted in FIGS. 17 and 18. As shown, the rack mechanism includes gear motor 80a with a crank 82a and shaft 84a operably connected thereto. Connected to the crank 82a is a substantially horizontal arm 86a which is connected to a substantially vertical swing arm 88a.

Swing arm 88 pivots at point 90*a* via pivot pin 92*a*. Rack pin 93*a* is attached to swing arm 88*a* and extends into the cooking chamber 30 through an opening in the oven side wall. Disposed between rack pin 93*a* and swing arm 88*a* is plate 97*a* having a sealing surface adjacent the side wall opening 95*a* through which the rack pin projects into the cooking cavity. Plate 97*a* and its sealing surface are large enough to cover and substantially seal the side wall opening through the entire range of swinging motion of the swing arm. In a preferred embodiment the sealing surface is made of a Teflon® material.

Still referring to FIGS. 17 and 18, a shaft 94*a* is attached to swing arm 88*a* and is positioned to extend across the bottom of the oven through an opening in the opposite side wall. A second swing arm 102*a* is attached to the opposite end of shaft 94*a*. A rack pin 104*a* is attached to second swing arm 102*a* above shaft 94*a*. Rack pin 104*a* extends from second swing arm 102*a* into the oven cooking chamber through a sealed opening in the side wall. Disposed between rack pin 104*a* and swing arm 102*a* is plate 99*a* having a sealing surface adjacent side wall opening. Plate 99*a* and its sealing surface are large enough to cover and substantially seal opening through the entire range of swinging motion of the swing arm. In a preferred embodiment the sealing surface is made of a Teflon® material. As described above in connection with the first rack movement mechanism, rack 70 is positioned over rack pins 93*a* and 104*a* (see FIGS. 2 and 3) such that the pins are disposed between the prongs 110, 112 which extend downwardly from rack 70.

Referring to FIGS. 3, 5, 8A, 8B and 9, the air distribution system of oven 10 shall be described. Temperature controlled air is circulated through the air distribution system by blower 300. As shown in FIG. 3, blower 300 includes a fan wheel 302. Blower 300 is mounted to the rear plenum wall 304 and circulates temperature controlled air into plenum 200. A ½ horsepower motor has been found to be suitable for powering the blower, although other motors are suitable and can be selected or designed based on oven size, blower design and other well-known engineering considerations. A blower wheel of the backward inclined type has also been found to be particularly suitable, although other blower wheel designs can be used. A particularly suitable blower is an Aspen blower with 6.75 inch diameter and 1.55 inch wide wheel and a 7000 RPM brushless DC motor (360 watts capacity) producing 450 cfm of air. Air from cooking chamber 30 is drawn into blower 300 through an opening after passing over heating elements 400.

Figure 8A:
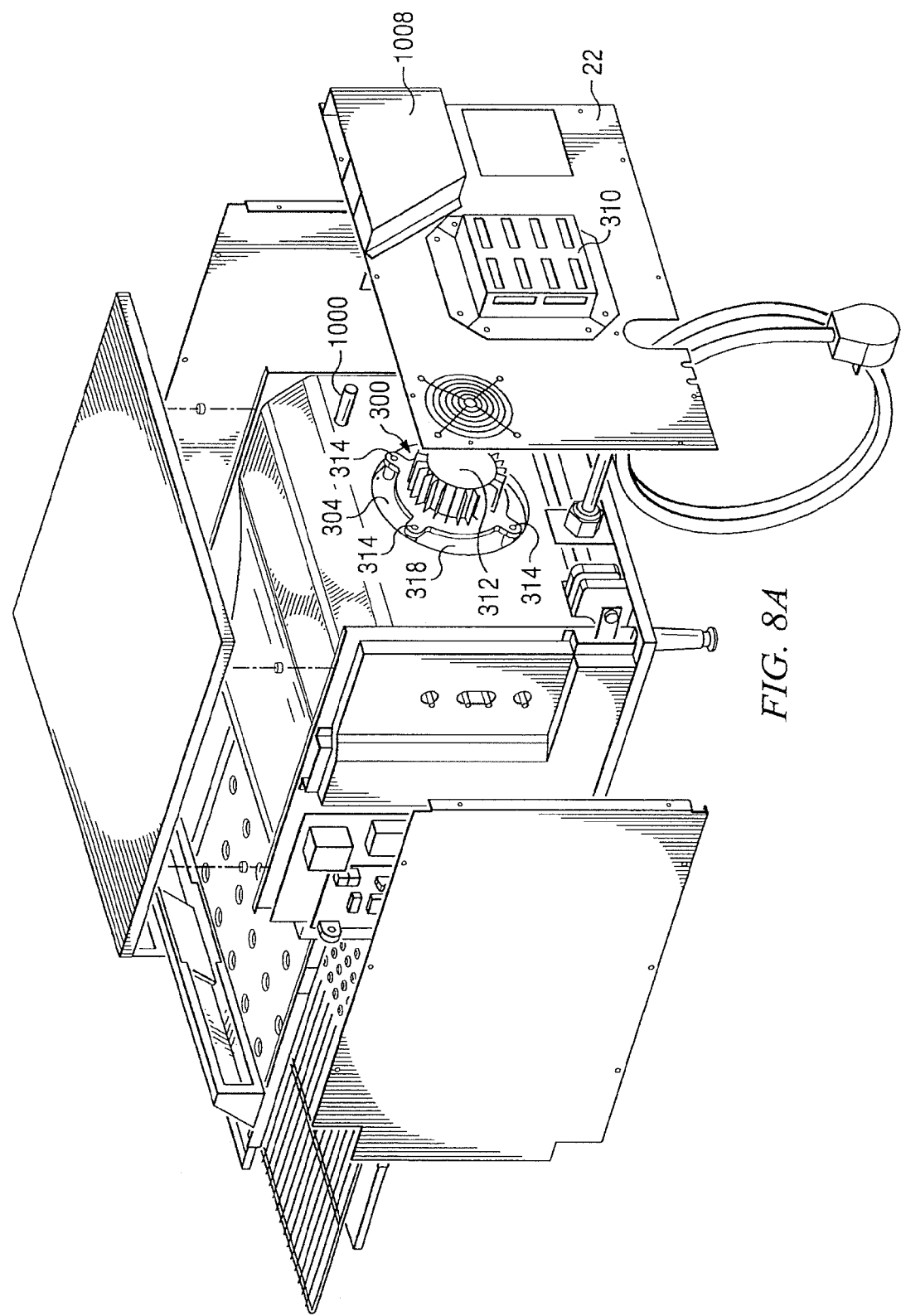
FIG. 8A is a partial exploded view depicting the oven of the present invention with the exterior housing exploded.
Figure 8B:
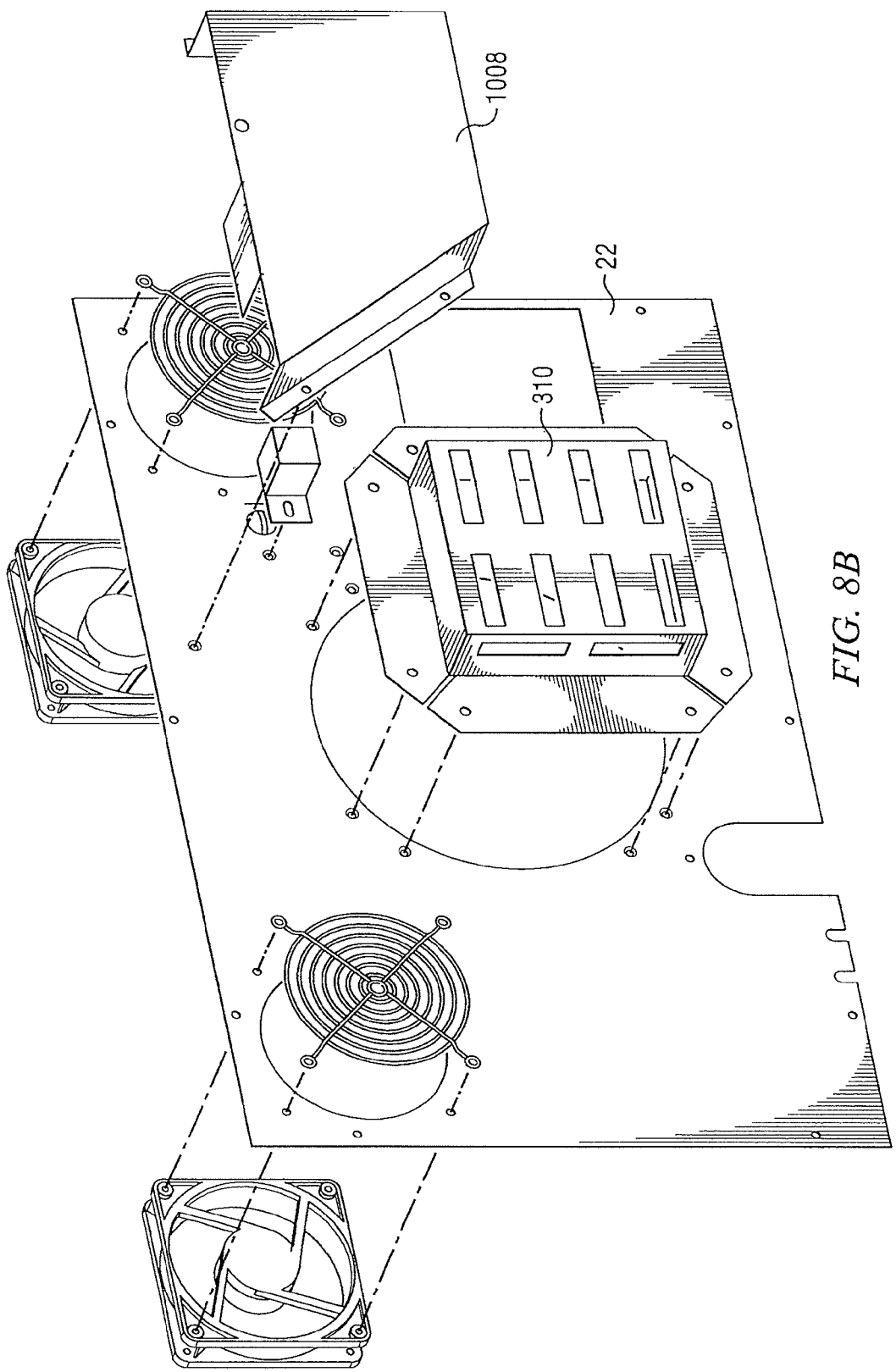
FIG. 8B is a partial exploded view of the back exterior wall of an oven embodying the present invention.
Figure 9:
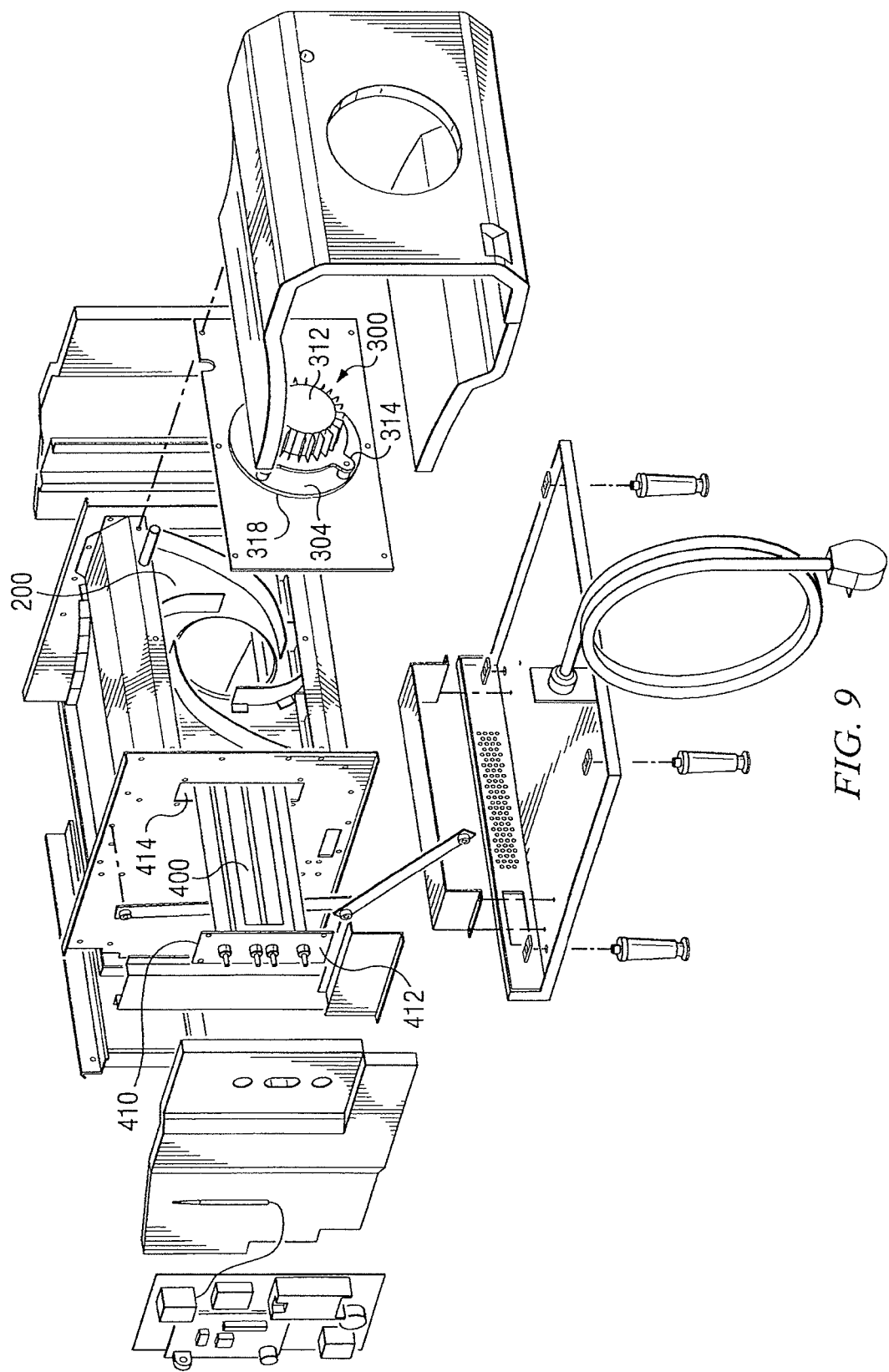
FIG. 9 is a partial exploded view of the oven without the exterior housing.
Figure 10:
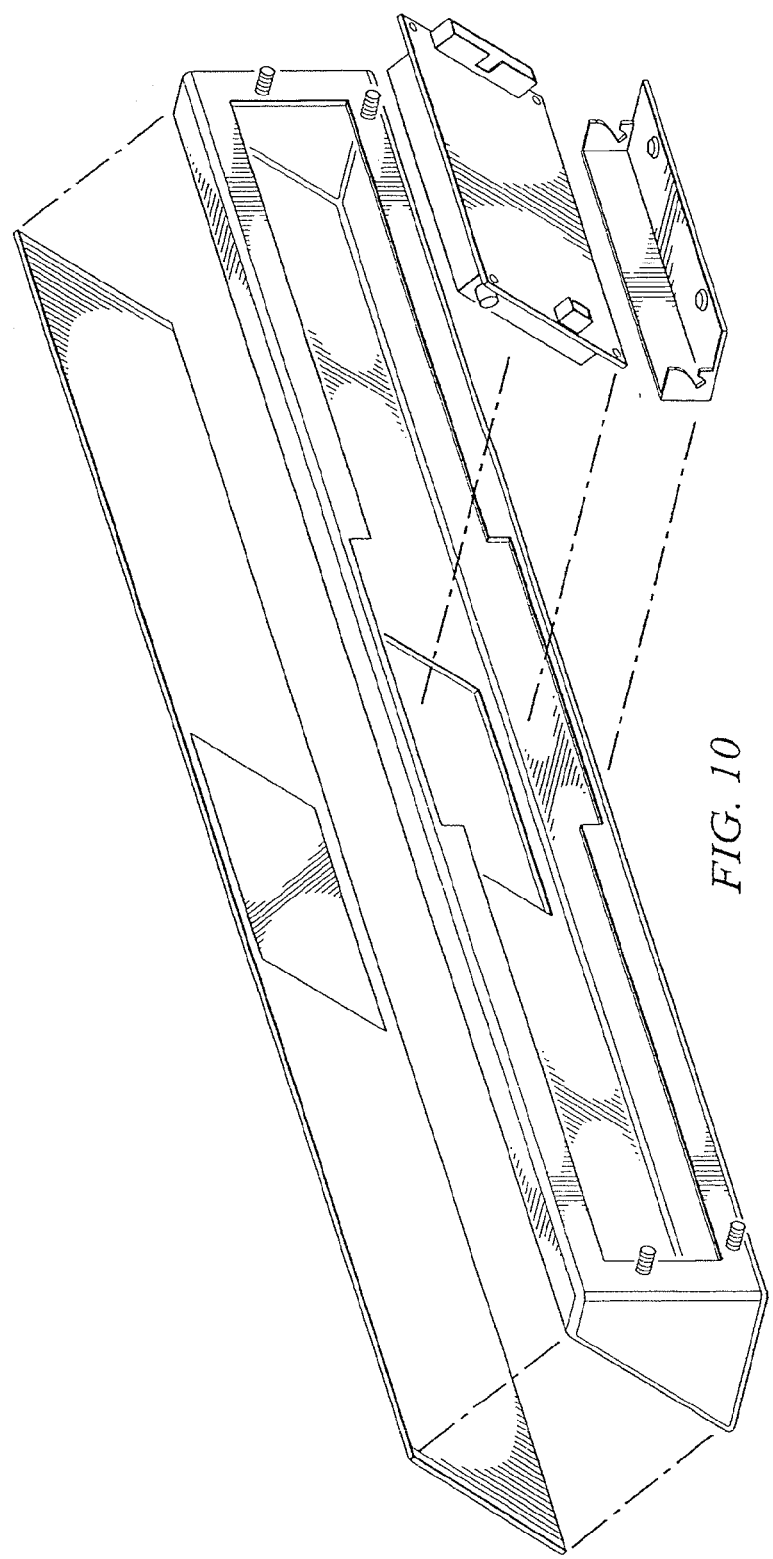
FIG. 10 is a partial exploded view of the control housing and display pad of the present invention.

In a most preferred embodiment of the invention, blower 300 is part of a readily removable blower assembly, as shown in FIGS. 8A, 8B and 9, allowing for the removal, repair and/or replacement of blower 300 without substantial disassembly of the oven. Referring to FIGS. 8A, 8B and 9, the removable blower assembly includes a vented back plate or shield 310 which is removably attached to the back wall 22 of the oven's exterior cabinet. Shield 310 may be removably attached to back wall 22 by well known means, such as screws. Disposed behind shield 310 is blower motor 312, which is removably mounted to the oven by screws 314. To remove the blower motor, the shield 310 is first removed and then screws 314 are removed thereby freeing the motor (and blower wheel). After repair of the blower or in the event of replacement, the blower wheel end of the motor-blower is simply reinserted through opening 318 and the assembly is secured to the oven with screws 314.

Although the figures depict an oven with having an air distribution system with a single blower, the air distribution system can include one or more blowers with their respective motors or one common motor driving these blowers. Further, the blower motors may be single or multiple speed Alternating Current type or Direct Current type. In addition, in a preferred embodiment, the motor and motor controls utilized provide fixed or variable speed control of the blower for optimum management of the air flow and air velocities.

Referring to FIGS. 5, 5A and 3, disposed within plenum 200 are vanes 220, which are designed to direct air toward upper outlet opening 204 and lower outlet opening 206 in the plenum. Air passing through upper outlet opening 204 is circulated to upper (or top) dispensing duct 210 through inlet opening 212 in said duct. Air passing through lower outlet opening 206 is circulated to a lower (or bottom) dispensing duct 214 through inlet opening 216 in said duct. FIG. 5 depicts a preferred vane arrangement for directing air within the plenum. As shown, four curved vanes 220A-D are positioned within plenum 200 and deflect and direct air within the plenum to the upper and lower outlet openings in the plenum. It has been found that this preferred vane arrangement provides a significant enhancement of air circulation in which the amount of air distributed from the upper jet plate into the cooking cavity is substantially equal to the air distributed from the lower jet plate. In some circumstances, however, it may be desirous to have greater heat transfer to the top of a food product or just the opposite—i.e., greater heat transfer to the bottom of the food product. In such cases, the number, design and arrangement of the plenum vanes may vary to produce the desired results.

Figure 4:
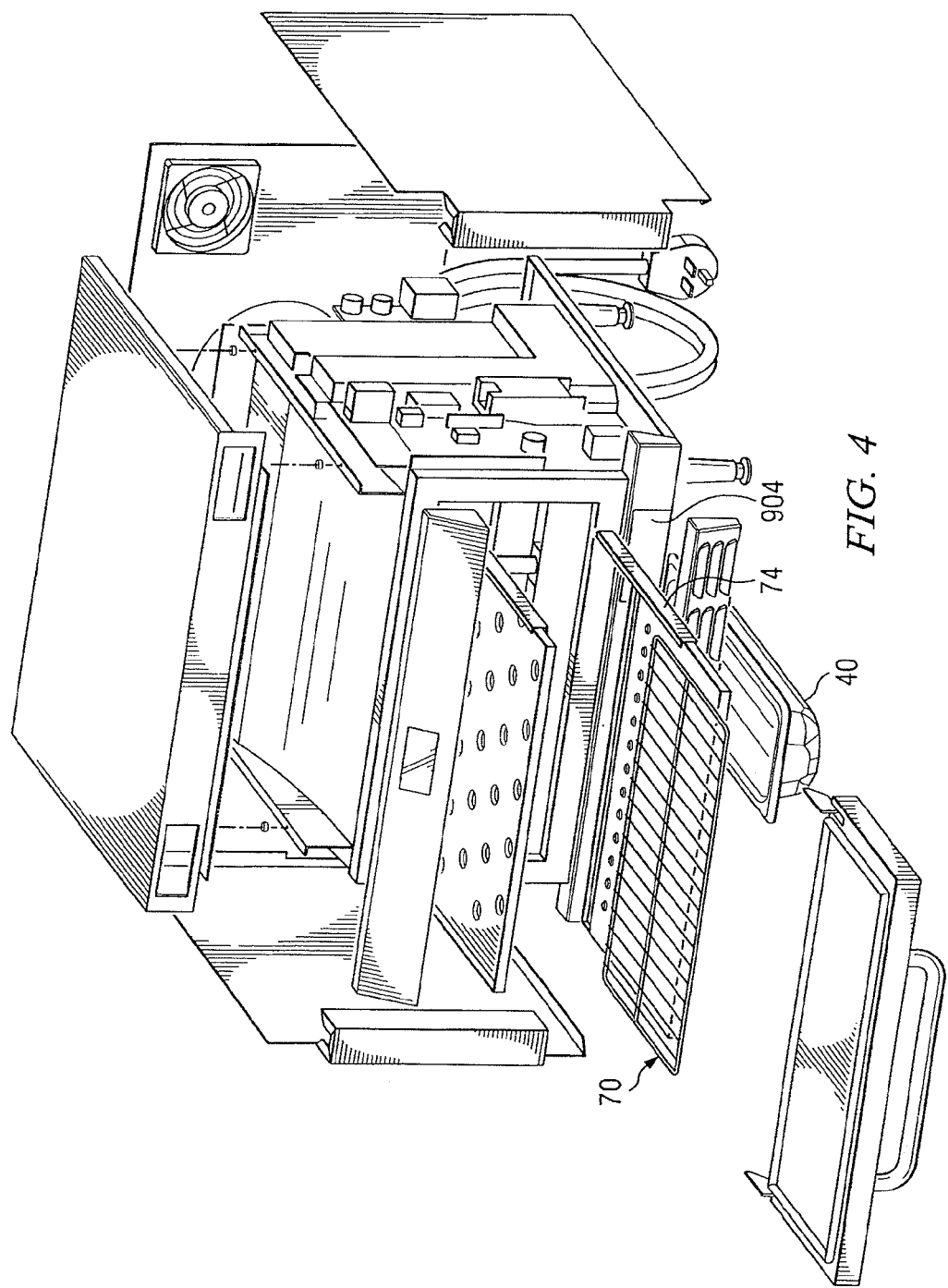
FIG. 4 is a partial exploded view of an oven embodying the present invention.

Referring to FIG. 3, disposed above and below the cooking chamber 30 and in fluid communication with plenum 200 are upper air dispensing duct 210 and lower air dispensing duct 214, respectively. Upper duct 210 receives temperature controlled air from plenum 200 through inlet opening 212. Air entering upper duct 210 exits through orifices 230 in plate 64 toward the top of food product disposed on rack 70. Lower duct 214 receives air from plenum 200 through inlet opening 216. Air entering lower duct 214 exits through orifices 240 in plate 66 toward the bottom of the food product (or pan) disposed on rack 70. The upper and lower ducts can be constructed of any of several known materials capable of withstanding and performing under the high temperature conditions of the oven, such as aluminized steels and stainless steels. As shown, the ducts 210 and 214 are preferably tapered along their respective longitudinal axes, with the cross sectional area (perpendicular to longitudinal axes) of the ducts being greater at their respective inlet openings (212 and 216) than the cross sectional area of their respective distal ends 224 and 226. As described above, each of the ducts 210 and 214 have a perforated surface or jet plate facing the rack 70. Orifices 230 and 240 are designed to direct streams of heated air against a food product or pan disposed on the rack. In a preferred embodiment, the jet plate orifices comprise circular nozzles as shown in FIGS. 2-4. Further, in the preferred embodiment depicted, the orifices 230 in the top jet plate are fewer and greater in diameter that the orifices 240 in the lower jet plate.

FIG. 3 depicts a preferred air duct arrangement for a small electric oven having a width (side wall to side wall) of about 18-19 inches, a depth (inside surface of door to back of oven) of 15-18 inches, and a height (between jet plates 64 and 66) of about 7-9 inches.

In a most preferred embodiment of the present invention, upper and lower ducts 210 and 214 have a curved tapered configuration. As shown in FIG. 3, the curved wall 250 opposite jet plate 64 substantially corresponds to the shape of a sine curve and provides a cross sectional area reduction of about 50% of the inlet opening area at approximately one-third (⅓) of the duct length. Similarly, the curved wall 260 opposite jet plate 66 substantially corresponds to the shape of a sine curve and provides a cross sectional area reduction of about 50% of the inlet opening area at approximately one-third (⅓) of the duct length.

In another preferred design, lower jet plate 66 includes a dual drain 600, as shown in FIG. 3. As shown, drain 600 is formed by a removable drain conduit 604 disposed beneath an opening 602 in lower jet plate 66. Grease and other liquids accumulating on the upper surface of the lower jet plate 66 are drained directly out of the oven through conduit 604 and opening 606 in the bottom of the oven. In addition, any grease or other liquids deposited at the bottom of the oven below the lower duct 214 are drained through opening 606, thus providing a dual drain design. Grease and other liquids exiting the oven through opening 606 are disposed in drain pan 40. The above-described drain system allows the oven chamber to remain relatively free of greases and other liquids and allows the oven to be flushed during cleaning with water or other cleaning solutions.

Figure 11:
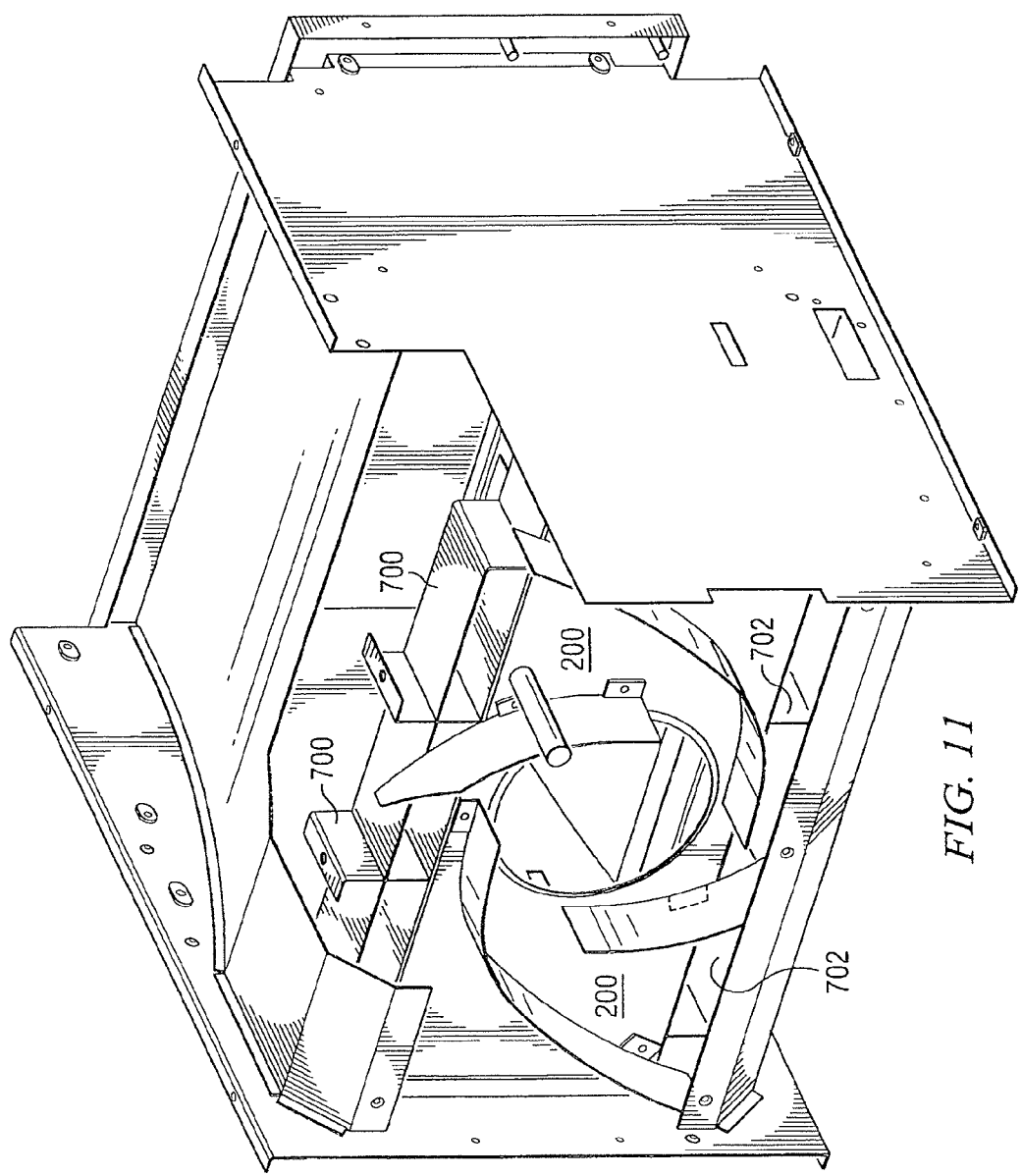
FIG. 11 is a view of the rear of the oven with outer housing removed, depicting the air plenum and air straightening vanes aspects of the air delivery system.
Figure 12:
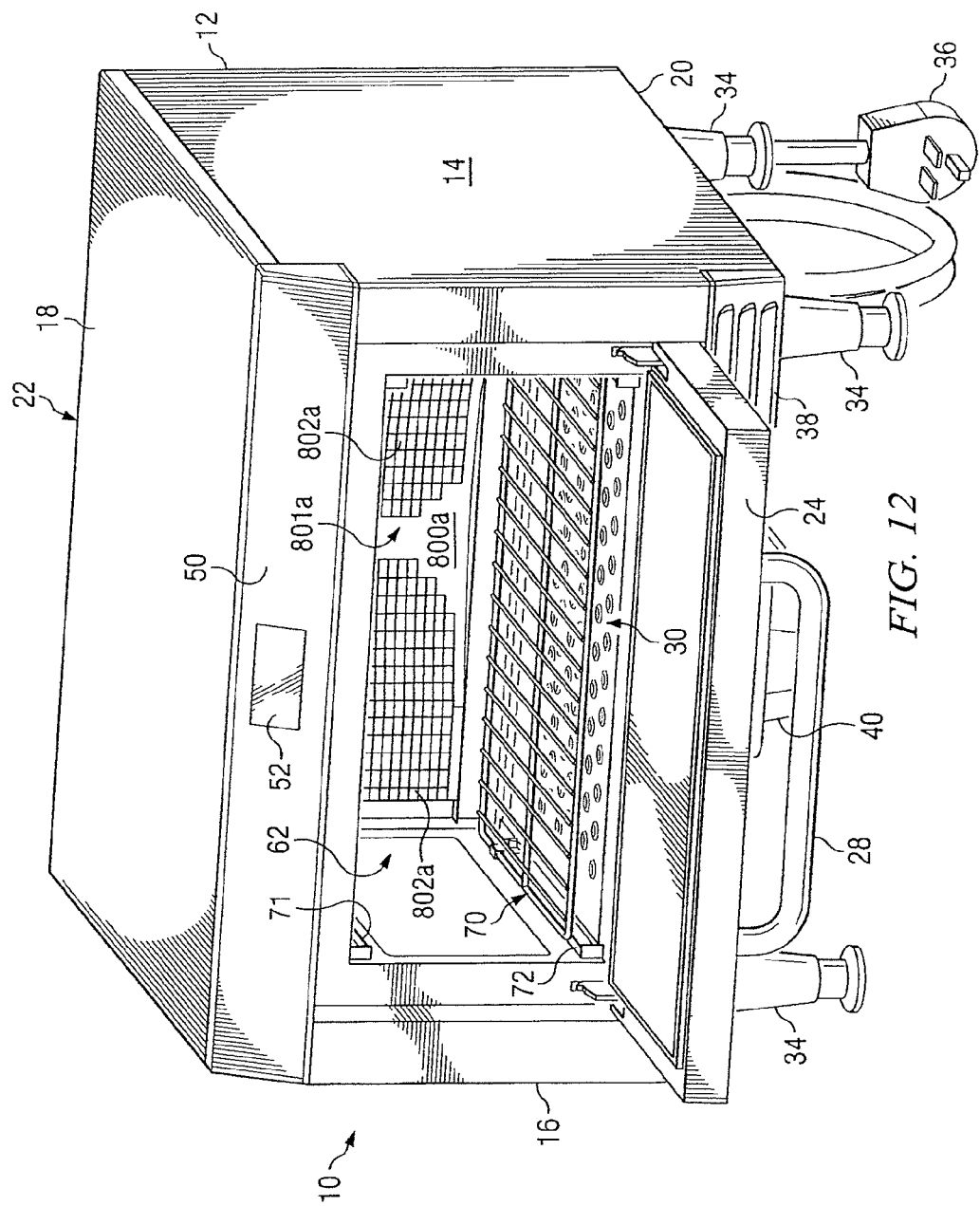
Figure 13:
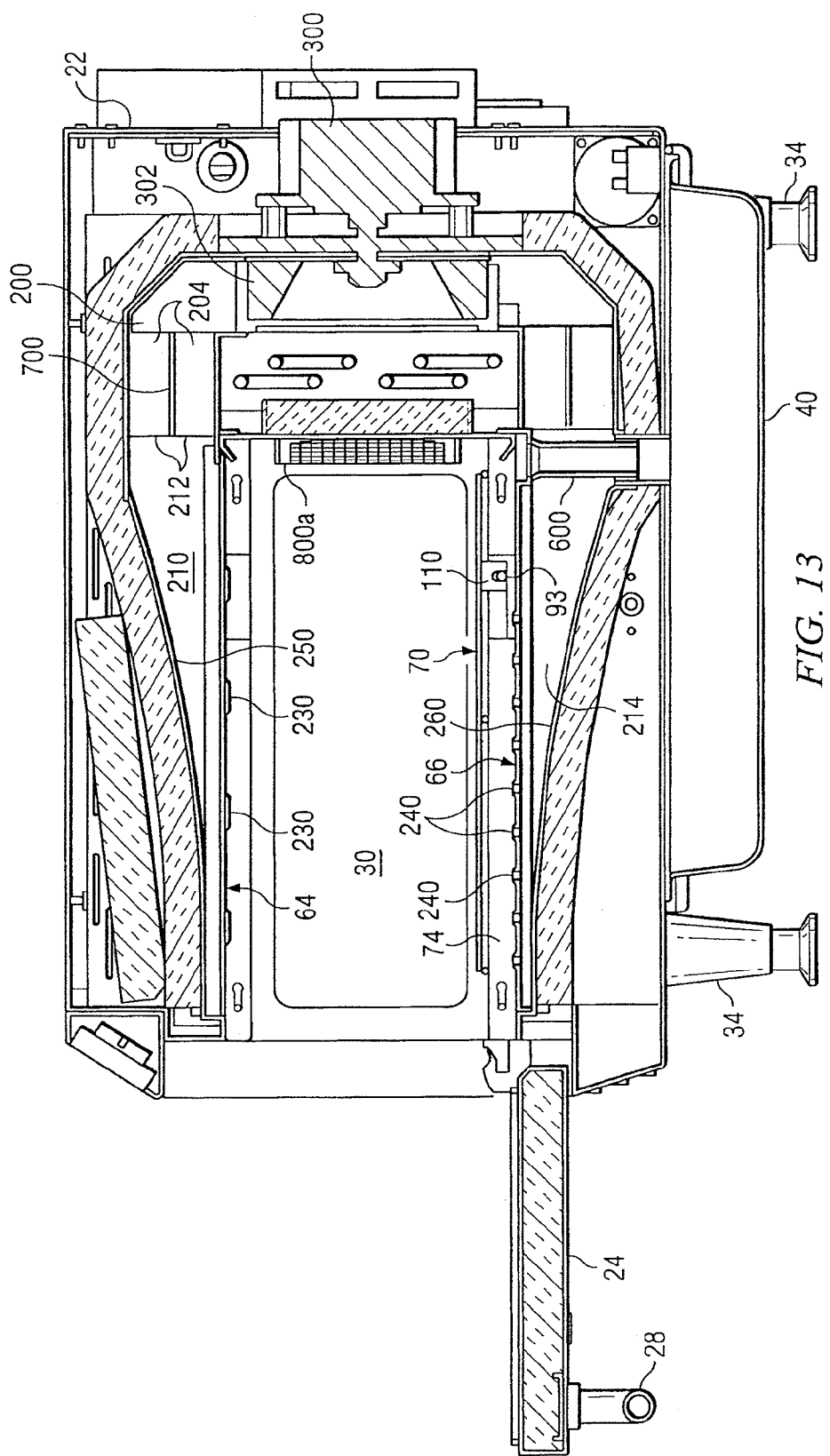

In a yet another preferred arrangement, the air distribution system includes straightening vanes 700 and 702 disposed between plenum outlet openings 204 and 206 and the inlet openings to upper and lower ducts 212 and 216. As shown in FIG. 11, straightening vanes 700 and 702 comprise as a series of vertical vanes and a horizontal vane. Straightening vanes 700 and 702 serve to reduce the turbulence of the temperature controlled air entering the air dispensing ducts. It has been observed that by reducing the turbulence of the air entering the dispensing ducts, air is more effectively dispensed into the cooking chamber of the oven.

In yet another preferred embodiment of the oven (see FIGS. 2, 3, 6 and 7), the back wall 62 of the cooking chamber comprises a plate 800 with openings 802 shaped and positioned to control the path of air returning to the blower. Plate 800 is positioned upstream of the catalytic converter material 810. Preferably, plate 800 is designed to be snapped or screwed into place for easy removal and cleaning. As shown in FIGS. 2 and 6, a preferred plate design includes u-shaped cut-outs on the plate adjacent the oven side walls 60A and 60B. In this configuration, plate 800 is substantially hour-glass in shape. It has been found that this design balances the flow of air returning to the blower, resulting in less return air interference with the cooking air streams or jets streams exiting upper and lower ducts 210 and 214. In addition, the plate 800 serves to shield the catalytic converter material from penetrations or damage during disassembly, cleaning and other operations that might otherwise subject the catalytic material to physical contact.

In the preferred embodiment depicted in FIGS. 3, 6 and 7, a catalytic converter material 810 is provided to reduce smoke that may otherwise result from grease and food particles contacting the heating elements. As shown in FIGS. 3, 6 and 7, mounted behind (i.e., downstream from) plate 800 is a sleeve or box 812 having a catalytic converter material 810 disposed therein. Preferably, the catalytic material is a foil-type catalytically coated material, known in the art. Preferred catalytic converter materials are precious metal-based materials, such as palladium or platinum/palladium-based materials manufactured by Catalytic Combustion Corporation or Englehard. In the preferred design depicted herein, the catalytic converter material has a cell arrangement with air passages (cells) arranged to provide area densities of preferably about 75 to 125 cells per square inch, depending on the air flow utilized. As the heated air passes the catalytic converter material, smoke and vapor (i.e., volatile organic compounds) in the circulating air stream are more completely oxidized to $CO_2$ and $H_2O$ to prevent smoke from being recirculated into the cooking chamber. By employing a catalyst, the oven can be "ventless" (as shown), i.e. the oven does not require the venting or exhaust of substantial amounts of cooking air that would require the use of an exhaust hood. In this regard, as shown in FIGS. 8A and 8B, a small air exhaust conduit 1000 extends from the cooking air circulation path to the outside of the oven for exhausting a small portion of the temperature controlled cooking air. A shield 1008 is disposed over conduit 1000 to direct and deflect exhaust air upwardly.

FIGS. 12-21D will now be referenced to describe alternative embodiments and aspects of the oven of the present invention. The descriptions set forth above apply to FIGS. FIGS. 12-21D where common reference numerals are used and will not be repeated.

Figure 14:
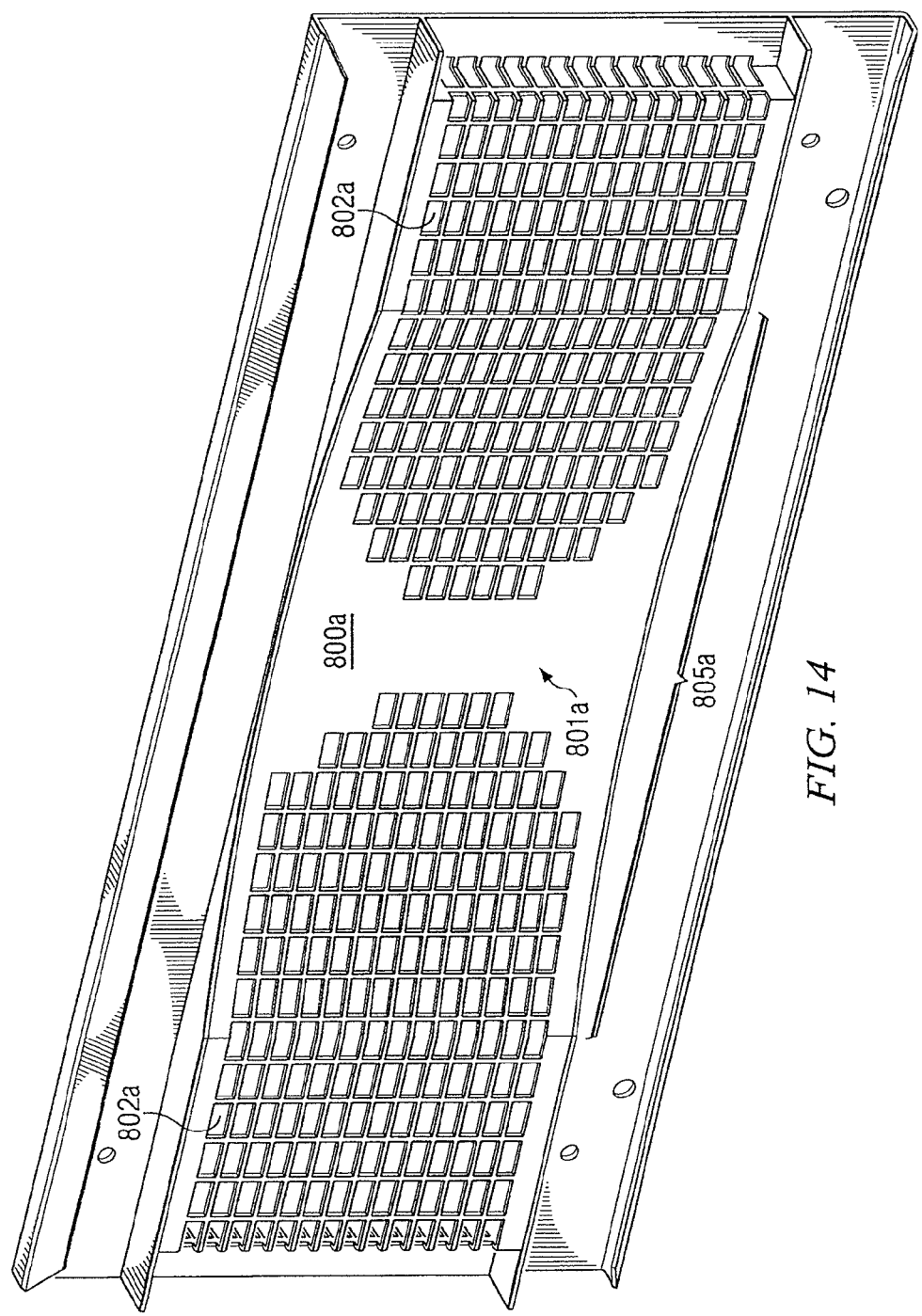
Figure 15:
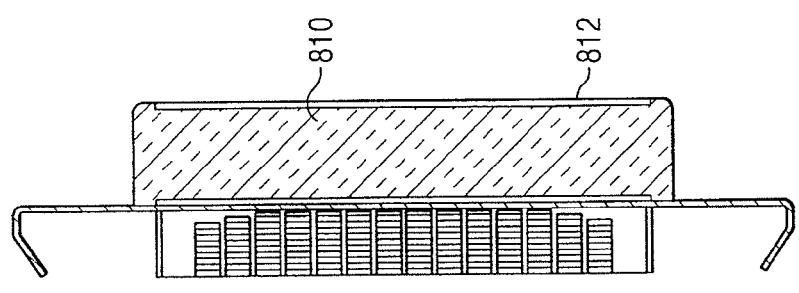
Figure 16:
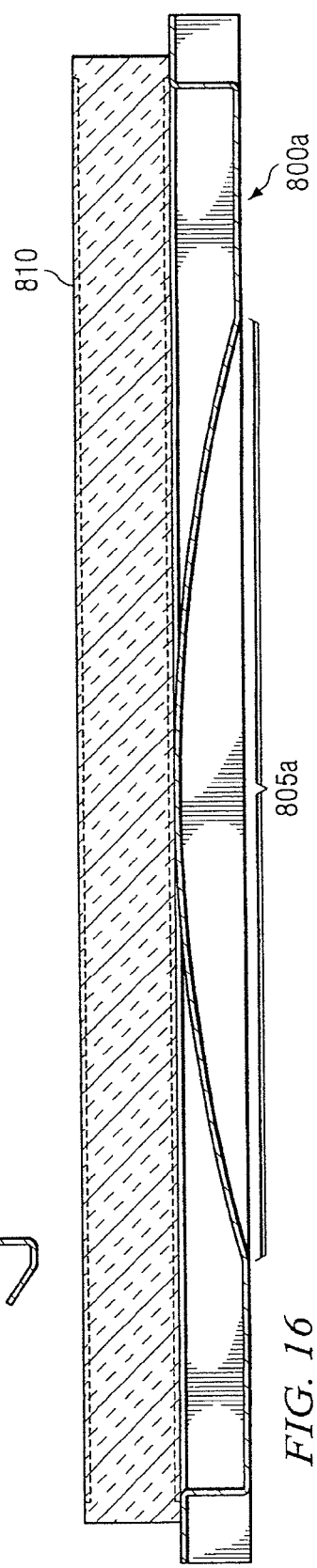

As depicted in FIGS. 12-16, an alternative to the hour-glass shaped plate 800 (see FIGS. 1, 6-7) is provided. Referring to FIGS. 12-16, the back wall 62 of the cooking chamber comprises a plate 800a having a plurality of perforations 802a designed to allow and control the path of air returning to the blower. As shown, plate 800a has a greater number of perforations (i.e., open area) at its lateral ends and has a region 801a at the approximate center that has fewer or no perforations. Preferably, the total open area of the perforations is at least 70-80% of the surface area of the exposed surface area of the catalyst material. As with the design of plate 800, the above-described perforation configuration of plate 800a is designed to prevent the air from returning to a centralized portion of the catalyst material, i.e., the perforation configuration serves to spread the return air flow across a greater portion of the surface area of the catalyst material, thus extending the life of the catalytic material and the improving the performance of the catalyst. Also, as shown in FIGS. 14 and 16, plate 800a includes a concave central portion 805a, which creates more space within the oven cavity for food products or food trays. In the preferred embodiment depicted in FIGS. 14 and 16, the concave portion 805a is substantially rounded and is designed to accommodate round pizzas and pizza trays.

The temperature of the circulated air or gas can be controlled by any known means. One suitable means to heat and control the temperature of the air is by well known electric heating rods 400 (i.e., Calrod). In a preferred embodiment, the heating elements are of a dual element heater design that can be activated separately or simultaneously for power management. Heating rods 400 can be disposed in any suitable location and can be of an open coil or sheathed type. In the embodiment depicted in FIG. 3, heat rods are placed in the return air path adjacent the blower intake and downstream from the catalytic converter 810. However, the heating element can be placed upstream or downstream of the catalyst material, depending on the particular needs of the end user. Better conversion rates may be attainable with the heating element installed upstream of the converter to increase the temperature of the conversion process. However, if the end user requires better access to the catalyst for cleaning or other purposes, it is preferred, as shown in FIG. 3, to employ a removable air balancing plate 800 upstream of the catalytic converter and the heater element downstream of the converter.

In a most preferred embodiment shown in FIG. 9, heating elements 400 are part of cartridge assembly 410 to allow for easy heating element maintenance and/or replacement without the need to disassemble the oven. As shown, heating cartridge assembly 410 includes a bulkhead plate 412 to which heating elements 400 are attached. Bulkhead plate 412 covers heating cartridge opening 414 in the sidewall 60B of the oven and is removably secured to the side of the oven with screws or other removable securing means. To replace or repair the heating element, bulkhead plate screws are simply removed and the entire cartridge with heating elements can be removed after disconnecting the electrical wiring. Upon replacement or repair, the electrical wiring is reconnected and the cartridge is reinserted through opening 414.

In another preferred embodiment of the oven as shown in FIGS. 4 and 5, a port 900 is provided for use with electronic communication and data technologies, such as phones, modems, wireless communication technologies, and diagnostic devices. For example, as shown in FIGS. 4 and 5, a "smart card" assembly is provided. In this configuration, a card 902 with magnetic strip is removably affixed to bullhead plate 904. A reading or sensing device capable of reading data on the card 902 is disposed within port 900. The card 902 can contain any data useful to cooking operations, such as heating and cook time settings for different food menus, voltage sensing, etc. As shown, bulkhead plate 904 covers port 900 behind vented panel 38 on the front of the oven and is removably secured to the oven with screws or other removable securing means. To replace or repair the smart card, bulkhead plate screws are simply removed and the entire cartridge with card 902 can be removed after disconnecting the electrical wiring. Upon replacement, the smart card assembly is reinserted in port 900 and the bulk head is attached to oven with screws.

Figure 19:
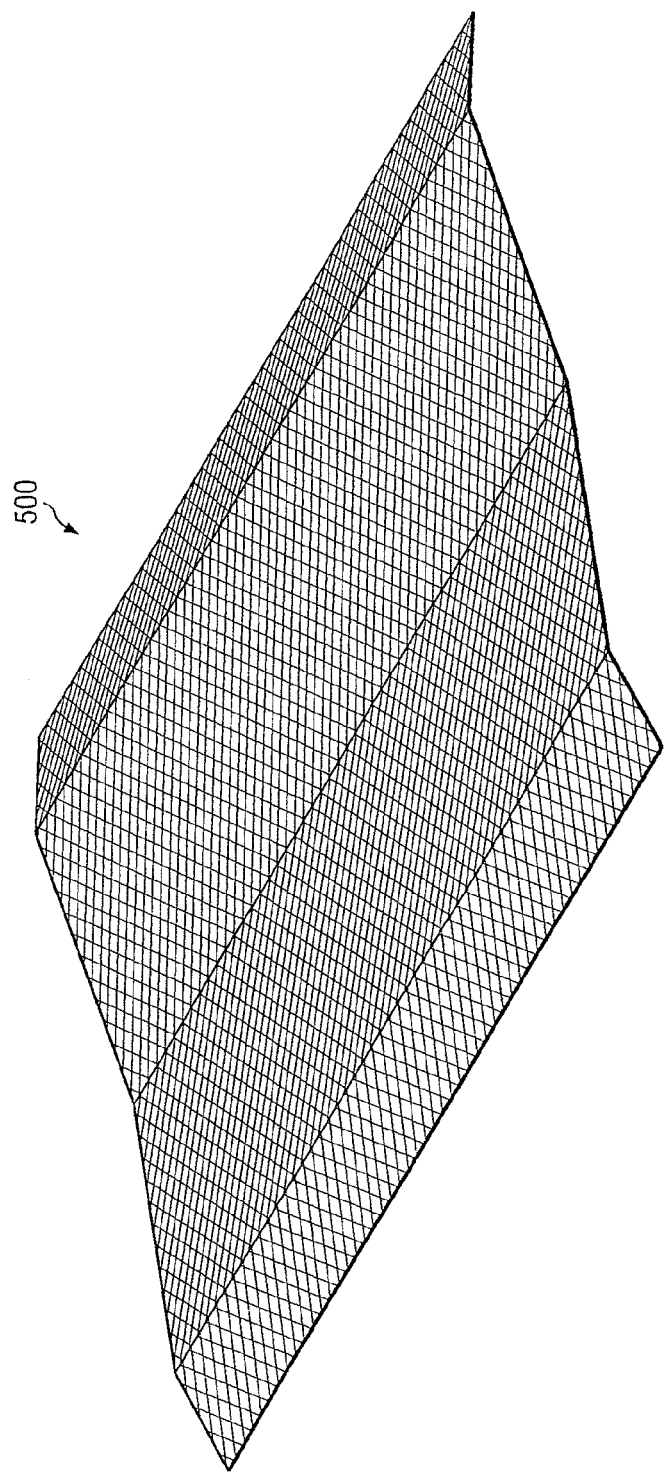
FIG. 19 is a perspective view of the air diffuser plate.
Figure 20:
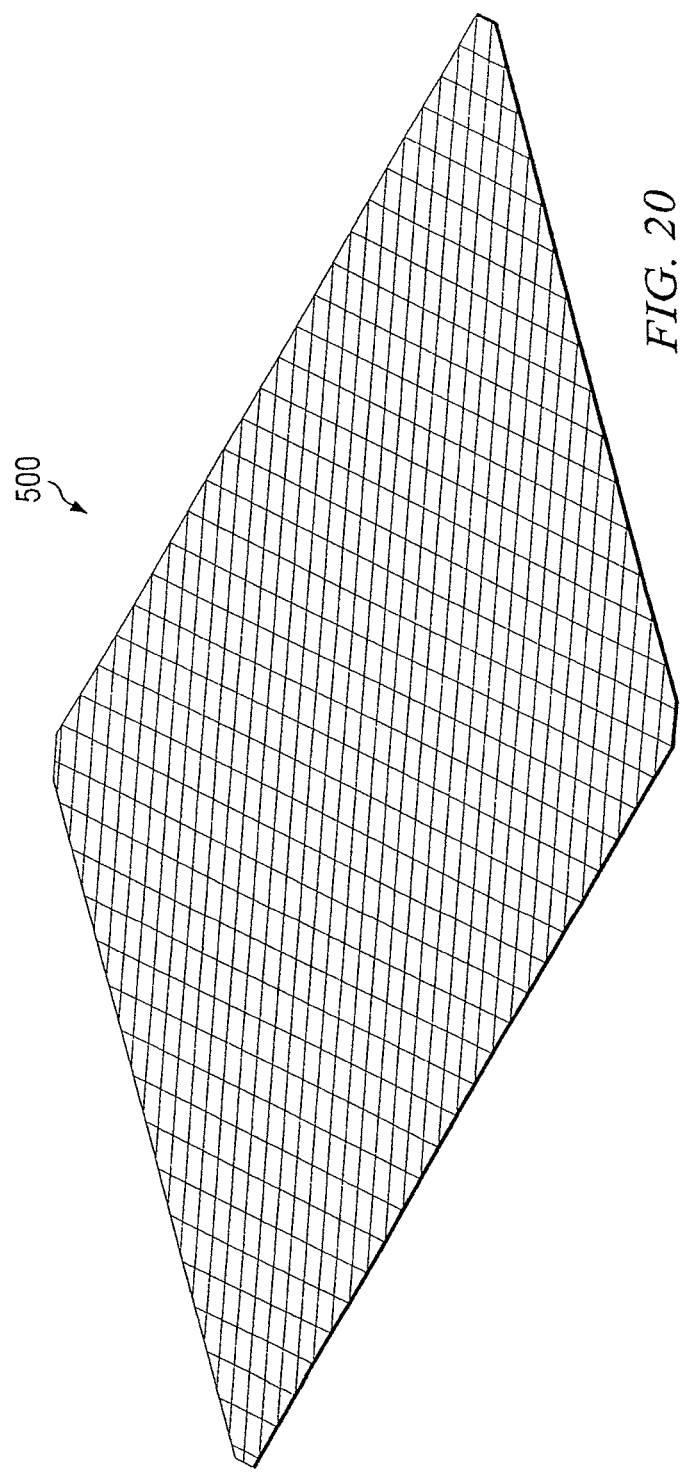
FIG. 20 is perspective view of an alternative air diffuser plate.
Figure 21A:
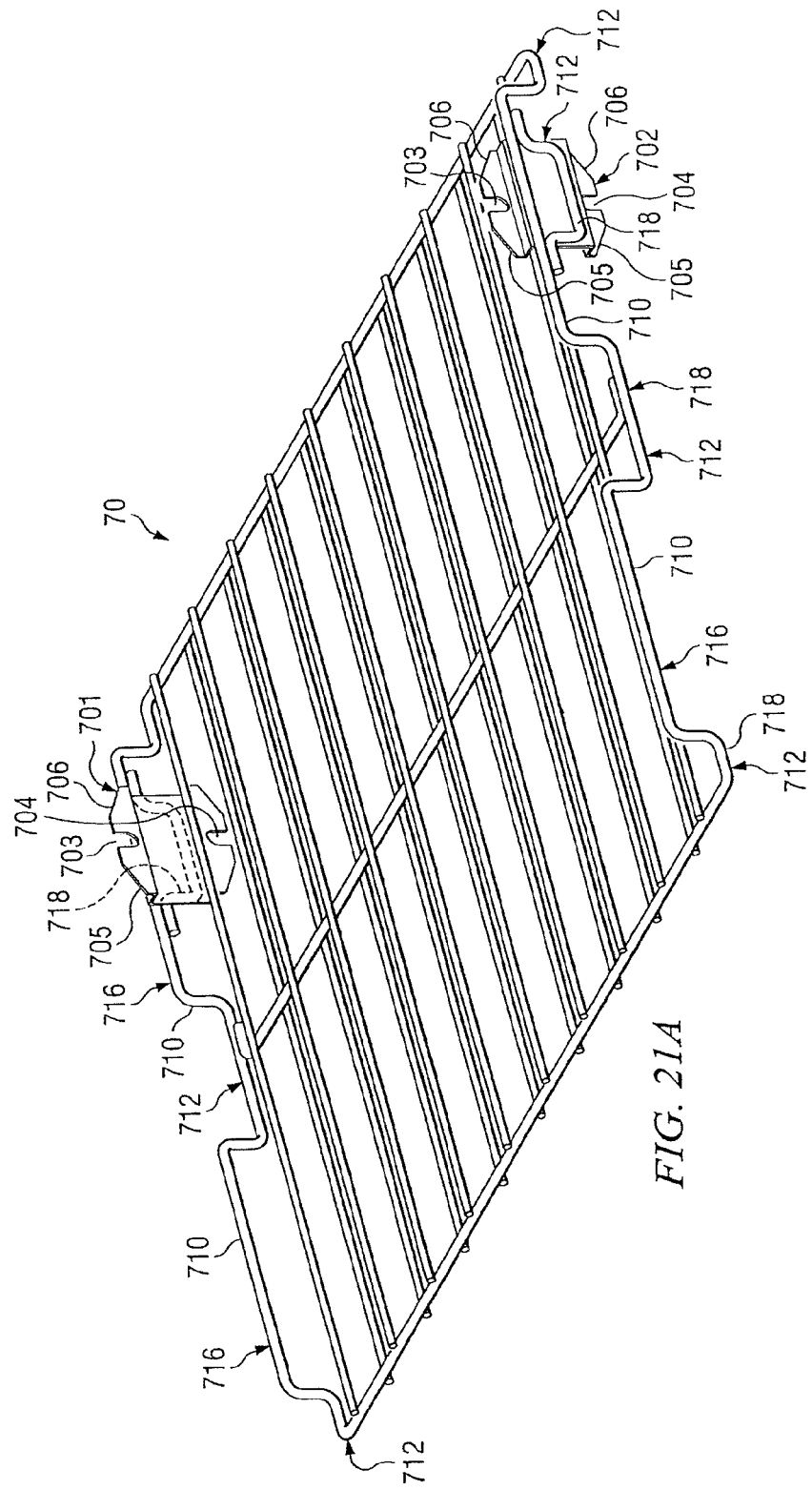
FIG. 21A is a perspective view of the reversible alternative rack.
Figure 21C:
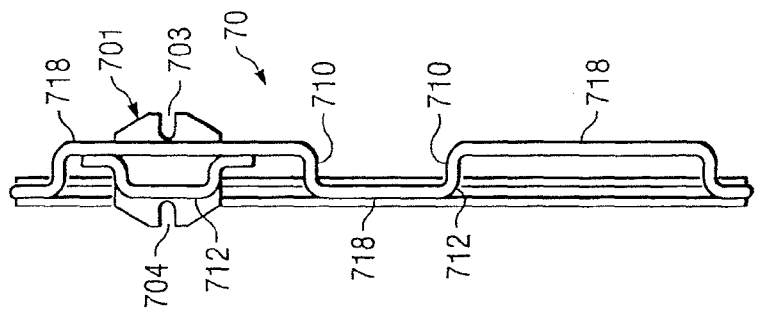
FIG. 21C is a side view of the reversible alternative rack.
Figure 21B:
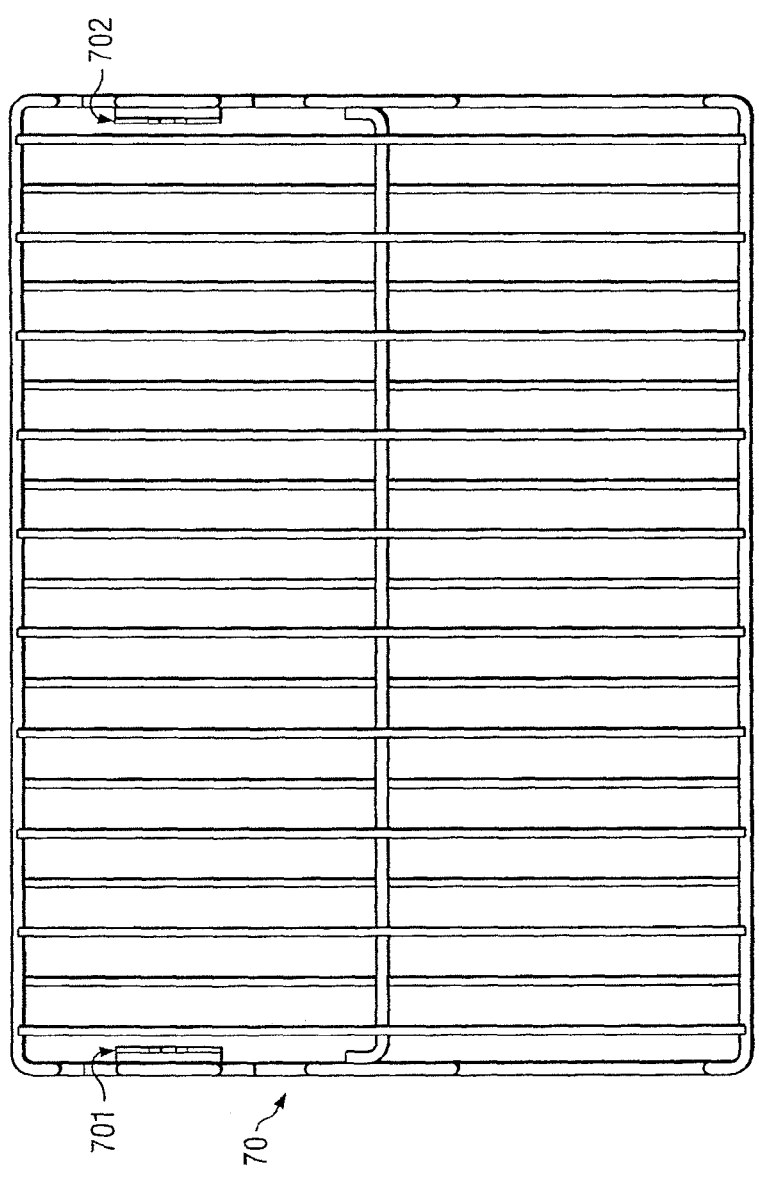
FIG. 21B is a top view of the reversible alternative rack.
Figure 21D:
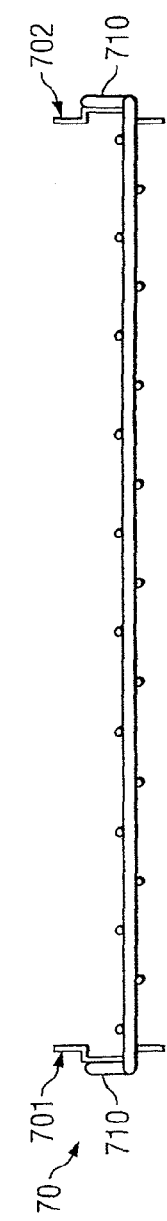
FIG. 21D is a front view of the reversible alternative rack.

For many products, the required rate of heat transfer to the top of the food product is significantly less than that required for the bottom of the product (e.g., biscuits and muffins). Thus, to provide flexibility some means of controlling or adjusting the relative heat transfer rates provided to the top and bottom of the food product is desirable. In a preferred embodiment of the invention such control is achieved using a removable diffuser plate 500 (FIG. 19). As shown in FIG. 19, the diffuser plate 500 is a mesh material that includes a plurality of openings. Alternatively, the diffuser plate can be constructed of a perforated material, such a stainless steel. As shown in FIG. 19, the preferred diffuser plate has a plurality of folds to enhance its strength. However, as shown in FIG. 20, the diffuser may be substantially flat. Diffuser plate 500 is designed for insertion below the upper jet plate 64 by opening the door of the oven and sliding it into place on rails 71 and 73, where it is held in place below (i.e., downstream from) the upper jet plate. In this preferred arrangement the diffuser plate can be inserted or removed regardless of the whether the oven is hot or cold (i.e., the plate is "hot swappable"). When inserted into the oven, the diffuser plate restricts air flow toward the rack, thereby reducing air flow (and heat transfer) to the top of a food product disposed on the rack. In a preferred embodiment, the perforations (openings) in the diffuser plate represent 50-60% of the total area of the diffuser plate. However, in order to provide maximum cooking flexibility, a series of plates, each with a different percentage of opening area (e.g., plates with 20%, 30%, 40%, 50%, 60%, 70% and 80%) can be supplied with the oven.

Although the diffuser plate has been described above as a preferable option to diffuse the air flow from the upper jet plate, the same plate can be used to diffuse air flow from the lower jet plate to control the heat transfer rate provided to the bottom of the food rack. In that arrangement, the diffuser plate is inserted in and held in place by the channels 75, 77 provided in rails 72 and 74.

In a most preferred embodiment of the oven, the jet plates, rack, and interior surfaces of the cooking cavity walls are coated with a high emissivity-high release coating to enhance the cleanability of the oven as well as the radiation heat within the cooking cavity. Such coatings are well known to those in the art and include, for example, Teflon® PTFE (polytetrafluoroethylene), Teflon® FEP (fluorinated ethylene propylene copolymer), Teflon® PFA (perfluoroalkoxy) and Teflon® ETFE (copolymer of ethylene and tetrafluoroethylene), Excaliber brand coating supplied by Whitford, Series 300 Fluoropolymer Coatings supplied by Endura, Ryton® brand coating supplied by Phillips Petroleum Company, and Realease™ brand coating supplied by Ferro Corporation. In yet another preferred aspect of the oven, rack 70, as depicted in FIGS. 21A-D, is designed to be reversible such that it has two positions—a higher position and lower position. As shown in FIGS. 21A-D, reversible rack 70 has plates 701 and 702 disposed on opposite sides of the rack. Plates 701 and 702 each have upper notches 703 and lower notches 704 and 704, respectively, designed to receive rack pins 93 and 104. Rack plates 701 and 702 also include tapered edges 705 and 706 on opposite sides of each notch. As shown, the tapered edges taper upwardly toward the adjacent notch, which not only allows the rack to be more easily seated on the rack pins when installing the rack, but also provides self-seating of the rack in operation should rack pins become displaced from the notched. Extending upwardly (FIG. 21A) from the side edges of the rack are support rails 710. Extending in the opposite direction (downwardly) from the side edges of the rack are a second set of support rails 712. As shown, support rails 710 are taller than the support rails 712—i.e., they extend a greater distance from the main rack surface than the support rails 712. Also, as shown, the upper edges 716 of the support rails 710 substantially correspond in height with the bottom of notches 703. The lower edges of 718 of support rails 712 substantially correspond in height with the bottom of notches 704. In the position shown in FIG. 21A, the rack pins are engaged in notches 704 and the rack is supported by the support rails 712, causing the rack to sit in a lower position in the cooking cavity. To position the rack in a relatively higher position, the rack is flipped over and the rack is supported by the "taller" rails 710, with the rack pins engaged in notches 703.

While the apparatuses disclosed above have been described as an oven equipped with heating elements for delivering heated air into the cooking compartment, it is intended that the heating elements may be replaced with cooling elements for circulating cold air into said compartment for cooling, freezing or controlled thawing products. In addition, although the oven designs disclosed herein provide rapid thermalization without microwave energy, the oven can be equipped with microwave energy means, which are well known in the art.

The present invention is not limited to the examples illustrated above, as it is understood that one ordinarily skilled in the art would be able to utilize substitutes and equivalents without departing from the present invention. Accordingly, although the present invention has been described with respect to preferred embodiments, various changes, substitutions and modifications of this invention may be suggested to one skilled in the art, and it is intended that the present invention encompass such changes, substitutions and modifications as fall within the scope of the appended claims.

The invention claimed is:
1. An oven comprising:
an exterior cabinet;
a door;
a cooking chamber, said cooking chamber including first and second interior side walls, a back wall, and a lower jet plate;
a blower for circulating gas through said lower jet plate into said cooking chamber;

a product support disposed within said cooking chamber above said lower jet plate;

rails disposed on opposite sides of the cooking chamber, positioned against the interior side walls, the rails comprising channels defined by upper and lower edges;

said product support being disposed on the upper edges of the rails, said rails being positioned such that the lower edges are positioned above the lower jet plate in use and configured to hold said lower jet plate in place when air is circulated therethrough and to provide a sealing surface between the lower jet plate and the lower edges of the rails.

2. The oven of claim 1 further comprising an upper jet plate disposed within said cooking chamber above said product support.

3. The oven of claim 1 further comprising a means for imparting movement to said product support during cooking operations.

4. The oven of claim 3 wherein said means for imparting movement to said product support imparts lateral movement to said support.

5. The oven of claim 3 wherein said product support comprises a rack.

6. The oven of claim 5 wherein said means for imparting movement to said rack includes at least one pin disposed within said cooking chamber and said rack includes a pair of downwardly extending prongs between which said at least one pin is seated.

7. The oven of claim 6 wherein said prongs have lower ends that flare outwardly to guide the seating of said pins between said prongs.

8. The oven of claim 4 wherein said means for imparting movement to said product support imparts movement in a substantially front-to-back direction.

9. The oven of claim 1 further comprising a removable drain conduit disposed beneath an opening in said lower jet plate, whereby liquids accumulating atop said lower jet plate can travel through said drain conduit toward an drain opening disposed at and through the bottom of said oven.

10. The oven of claim 9 wherein said drain opening disposed at and through the bottom of said oven is configured to permit liquid disposed in said oven below said lower jet plate to flow through said drain opening 11. An oven comprising:
an exterior cabinet;
a door;
a cooking chamber, said cooking chamber comprising first and second interior side walls, and a back wall;
a product support disposed within said cooking chamber;
a duct having a jet plate with a plurality of orifices;
a blower for circulating gas into said duct, through said orifices in said jet plate and into said cooking chamber toward said product support;
a gas return opening in said cooking chamber through which said gas returns to said blower; and
a removable return plate positioned adjacent said gas return opening, the return plate having a substantially hour glass shape formed by cut-out portions at edges of the plate located adjacent the interior side walls in use, around which said gas is returned through said return opening such that gas flow is prevented through a centralized portion of the return plate.

12. The oven of claim 11 further comprising a catalytic converter material upstream of said blower.

13. The oven of claim 12 wherein said removable return plate is positioned upstream and adjacent to said catalytic converter material.

14. An oven comprising:
an exterior cabinet; a door;
a cooking chamber, said cooking chamber including first and second interior side walls, and a back wall;
a product support disposed within said cooking chamber;
a duct having a jet plate with a plurality of orifices;
a blower for circulating gas into said duct, through said orifices in said jet plate and into said cooking chamber toward said product support;
a gas return opening in said cooking chamber through which said gas returns to said blower; and
a return plate positioned adjacent said gas return opening, said plate having lateral ends and a center portion, said plate further having a plurality of perforations, wherein the density of holes per unit area is not constant across the return plate such that the perforations are bunched along the lateral ends of the return plate, and gas flow is prevented through a central portion of the plate.

15. The oven of claim 14 further comprising a catalytic converter material upstream of said blower.

16. The oven of claim 15 wherein said return plate is positioned upstream and adjacent to said catalytic converter material.

* * * * *